US011953733B2

(12) United States Patent
Suzuki et al.

(10) Patent No.: US 11,953,733 B2
(45) Date of Patent: Apr. 9, 2024

(54) LIGHT SOURCE UNIT AND OPTICAL HEAD

(71) Applicant: HAMAMATSU PHOTONICS K.K., Hamamatsu (JP)

(72) Inventors: Tomofumi Suzuki, Hamamatsu (JP); Kazuo Iwazaki, Hamamatsu (JP); Tatsuya Sugimoto, Hamamatsu (JP); Katsumi Shibayama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/039,038

(22) PCT Filed: Oct. 1, 2021

(86) PCT No.: PCT/JP2021/036477
§ 371 (c)(1),
(2) Date: May 26, 2023

(87) PCT Pub. No.: WO2022/145098
PCT Pub. Date: Jul. 7, 2022

(65) Prior Publication Data
US 2024/0004144 A1    Jan. 4, 2024

(30) Foreign Application Priority Data

Dec. 28, 2020  (JP) .................................. 2020-218444

(51) Int. Cl.
*G02B 6/36* (2006.01)
*G01N 21/35* (2014.01)

(52) U.S. Cl.
CPC .......... *G02B 6/3624* (2013.01); *G01N 21/35* (2013.01); *G01N 2021/3595* (2013.01); *G01N 2201/08* (2013.01)

(58) Field of Classification Search
CPC ...... G02B 6/3624; G02B 6/3616; G02B 6/36; G01N 21/35; G01N 2021/3595;
(Continued)

(56) References Cited

U.S. PATENT DOCUMENTS 9,228,725 B2 *   1/2016  Ito ..................... G02B 23/2469
2012/0190990 A1 *  7/2012  Ohzawa ................ G02B 23/26
                                                                600/478
2016/0242625 A1 *  8/2016  Kumagai ........... A61B 1/00097

FOREIGN PATENT DOCUMENTS

JP          2001-100113 A    4/2001
JP              3423304 B1    7/2003
(Continued)

OTHER PUBLICATIONS

International Preliminary Report on Patentability dated Jul. 13, 2023 for PCT/JP2021/036477.

*Primary Examiner* — Bao Q Truong
(74) *Attorney, Agent, or Firm* — Faegre Drinker Biddle & Reath LLP

(57) ABSTRACT

A light source unit includes a plurality of light sources emitting light for irradiating an object, and a holding portion holding the plurality of light sources having an insertion hole for an optical fiber inserted therethrough to propagate the light from the object formed therein. The holding portion holds each of the plurality of light sources such that an irradiation region of the light of each of the plurality of light sources is formed on one side of the holding portion. The insertion hole has a first opening that is an opening facing the irradiation region and a second opening that is an opening different from the first opening, and is formed in the holding portion such that one end surface of the optical fiber is exposed from the first opening and faces the irradiation region when the optical fiber is inserted therethrough.

20 Claims, 23 Drawing Sheets

(58) Field of Classification Search
CPC .......... G01N 2201/08; G01J 3/10; G01J 3/42; F21V 17/00; F21V 17/10; F21V 2200/10; F21V 2200/13; F21Y 2101/00; F21Y 2115/10; F27Y 2115/30
See application file for complete search history.

(56) References Cited

FOREIGN PATENT DOCUMENTS

| JP | 2015-088283 A | 5/2015 |
|----|---------------|--------|
| JP | 2018-004498 A | 1/2018 |
| WO | WO-2011/162342 A1 | 12/2011 |
| WO | WO-2015/190134 A1 | 12/2015 |
| WO | WO-2020/138091 A1 | 7/2020 |

* cited by examiner

*Fig.12*
(a)
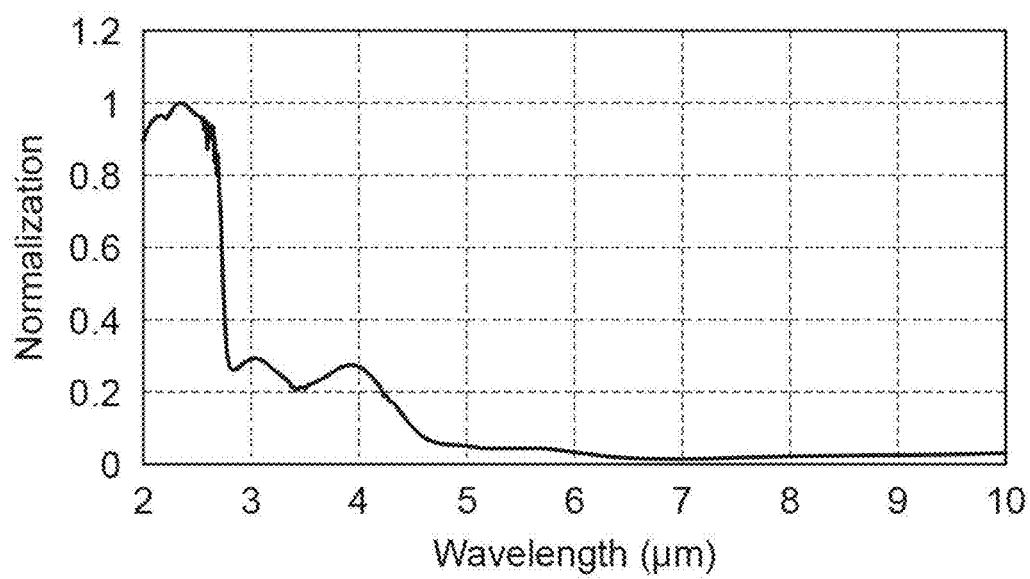
(b)
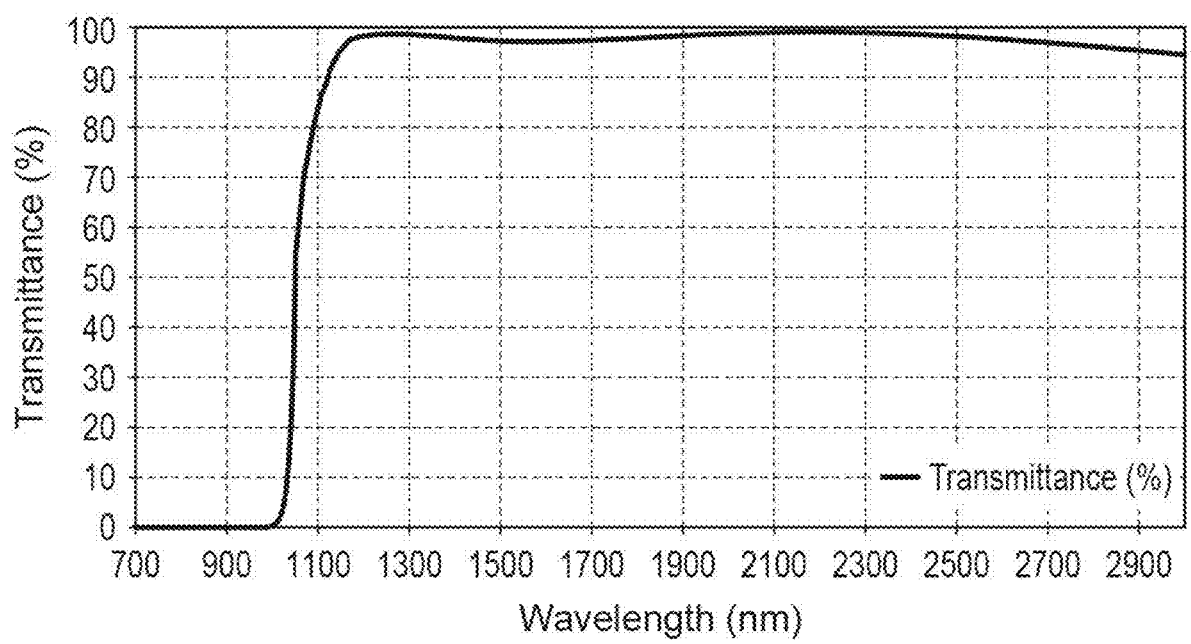

LIGHT SOURCE UNIT AND OPTICAL HEAD

TECHNICAL FIELD

The present disclosure relates to a light source unit and an optical head.

BACKGROUND ART

Patent Literature 1 discloses a near-infrared interactance spectrometric measurement device. This measurement device includes a device main body and a probe. Further, a flexible cable is provided in a manner of connecting the device main body and the probe, and an optical fiber is stored in the flexible cable. A spectrometer, a detector, or the like is provided inside the device main body. The probe has a casing. Inside the casing, a plurality of light sources emitting light are disposed in a manner of facing a measurement opening provided in one wall portion of the casing. In addition, an incidence end of the optical fiber is disposed in another wall portion of the casing. Interactance light from a sample which has received light irradiation from the light sources is incident on the incidence end of the optical fiber via a rectangular prism and a condensing lens.

CITATION LIST

Patent Literature

[Patent Literature 1] Japanese Unexamined Patent Publication No. 2018-4498

SUMMARY OF INVENTION

Technical Problem

In the probe of the foregoing measurement device, the light sources are provided close to the measurement opening of the casing. On the other hand, the incidence end of the optical fiber is disposed in a wall portion different from the wall portion in which the measurement opening is formed in the casing. Therefore, even if the probe is disposed such that the measurement opening and the light sources become closer to a sample, since the incidence end of the optical fiber cannot be brought closer to the sample, it is difficult to effectively propagate feeble light from the sample to the detector via the optical fiber. In contrast, in the probe of the foregoing measurement device, it is conceivable that the incidence end of the optical fiber be disposed in the vicinity of the measurement opening. However, in this case, stray light is likely to be incident on the optical fiber.

Hence, an object of the present disclosure is to provide a light source unit capable of curbing incidence of stray light on an optical fiber while effectively propagating light from an object through the optical fiber, and an optical head.

Solution to Problem

A light source unit according to the present disclosure includes a plurality of light sources configured to emit light for irradiating an object, and a holding portion configured to hold the plurality of light sources and formed with an insertion hole configured to be inserted an optical fiber for propagating the light from the object. The holding portion holds each of the plurality of light sources such that an irradiation region of the light of each of the plurality of light sources is formed on one side of the holding portion. The insertion hole includes a first opening that is an opening facing the irradiation region and a second opening that is an opening different from the first opening, and is formed in the holding portion such that one end surface of the optical fiber is exposed from the first opening and faces the irradiation region when the optical fiber is inserted therethrough. One end portion of the optical fiber including the one end surface is positioned between the plurality of light sources with a light blocking member therebetween when the optical fiber is inserted through the insertion hole.

In this light source unit, the insertion hole for the optical fiber inserted therethrough is formed in the holding portion holding the plurality of light sources. Particularly, the one end portion of the optical fiber including the one end surface is positioned between the plurality of light sources with the light blocking member therebetween when the optical fiber is inserted through the insertion hole. Therefore, since the one end surface of the optical fiber can also be brought closer to the object by disposing this light source unit such that the light sources become closer to the object, feeble light from the object can be effectively propagated through the optical fiber. Moreover, since the light blocking member is interposed between the light sources and the one end portion of the optical fiber, incidence of stray light on the optical fiber can be curbed.

In the light source unit according to the present disclosure, the insertion hole may be formed in the holding portion such that one end surface of the optical fiber protrudes from the first opening when the optical fiber is inserted therethrough. In this case, since the one end surface of the optical fiber protrudes, the one end surface of the optical fiber can be brought closer to the object. For this reason, feeble light from the object can be effectively propagated through the optical fiber.

In the light source unit according to the present disclosure, an inner surface of the insertion hole may include a tapered portion formed into a tapered shape such that the insertion hole expands from the first opening toward the second opening, and connected to the second opening. In this case, when the optical fiber is inserted through the insertion hole from the second opening of the insertion hole, the one end portion of the optical fiber can be guided toward the first opening due to the tapered portion on the inner surface of the insertion hole.

In the light source unit according to the present disclosure, the holding portion may include a flat surface portion intersecting a direction toward the second opening from the first opening. The flat surface portion may be formed on at least one of an end surface of the holding portion having the second opening formed therein and an inner surface of the insertion hole. In this case, when the optical fiber is inserted through the insertion hole, the optical fiber can be positionally set in a direction toward the second opening from the first opening (that is, an optical axis direction of the optical fiber in a state of being inserted through the insertion hole), for example, by causing another member holding the optical fiber to abut the flat surface portion of the holding portion.

In the light source unit according to the present disclosure, the holding portion may include the light blocking member provided in a manner of protruding along an edge portion of the first opening such that the one end portion of the optical fiber is covered when the optical fiber is inserted through the insertion hole and protrudes from the first opening. In this manner, by providing the light blocking member in the holding portion, when incidence of stray light on the optical fiber is curbed, for example, work of coating the one end portion of the optical fiber with the light blocking member or the like is no longer essential. However, the optical fiber may be coated with the light blocking member.

In the light source unit according to the present disclosure, the holding portion may hold the plurality of light sources such that the irradiation regions of the plurality of respective light sources overlap each other. The insertion hole may be formed such that an optical axis of the optical fiber passes through an overlapping region where the irradiation regions of the plurality of light sources overlap each other when the optical fiber is inserted therethrough. In this case, an intersection where the irradiation regions of the plurality of light sources and the optical axis of the optical fiber inserted through the insertion hole intersect each other is formed. Therefore, light from the object can be effectively incident on the optical fiber by disposing the light source unit such that the object can be aligned with this intersection.

In the light source unit according to the present disclosure, hole portions for disposing the plurality of light sources may be formed in the holding portion. The holding portion may hold the plurality of light sources in a state where outer surfaces of the plurality of light sources are in contact with inner surfaces of the hole portions. At least parts on the inner surfaces of the hole portions coining into contact with the outer surfaces of the plurality of light sources may be formed into shapes along shapes of the outer surfaces of the light sources. In this case, contact areas between the inner surfaces of the hole portions and the light sources can be increased, and heat can effectively dissipate from the light sources to the holding portion.

In the light source unit according to the present disclosure, the holding portion may include resin portions filling spaces between the inner surfaces of the hole portions and the outer surfaces of the light sources. In this case, heat can more effectively dissipate from the light sources to the holding portion. In addition, as described above, if spaces between the inner surfaces of the hole portions and the outer surfaces of the light sources are filled with a resin in a state where the light sources are in contact with the inner surfaces of the hole portions and the shapes of the inner surfaces of the hole portions lie along the shapes of the outer surfaces of the light sources, the amount of resin used is reduced. As a result, distortion (stress) of a resin is unlikely to be applied to the light sources.

An optical head according to the present disclosure is an optical head for irradiating an object with light and providing light from the object to a photodetector. The optical head includes the foregoing light source unit; a fixing portion holding the optical fiber and fixing a position of the optical fiber; the optical fiber inserted through the insertion hole while being fixed to the fixing portion; a casing accommodating at least a part of the light source unit, the fixing portion, and the optical fiber; and a light transmissive window member disposed in a manner of facing the one end surface of the optical fiber.

This optical head includes the foregoing light source unit. Therefore, it is possible for effects similar to those of the foregoing light source unit to be exhibited. Moreover, this optical head includes the window member disposed in a manner of facing the one end surface of the optical fiber. Therefore, the one end surface of the optical fiber can be kept clean. As described above, according to this light source unit, since the one end surface of the optical fiber can be brought even closer to the object, fouling of the one end surface of the optical fiber is more effectively prevented by the window member.

The optical head according to the present disclosure may further include the light blocking member provided in the optical fiber such that at least the one end portion of the optical fiber is coated therewith while the one end surface is exposed. In this manner, by providing the light blocking member in the optical fiber, when incidence of stray light on the optical fiber is curbed, work of providing the light blocking member in the holding portion of the light source unit is no longer essential. However, the light blocking member may be provided in the holding portion.

In the optical head according to the present disclosure, the light source unit and the fixing portion may be formed separately from each other. The fixing portion may hold the optical fiber in a state where the one end portion of the optical fiber protrudes from the fixing portion. The light source unit may be detachably attached to the fixing portion in a state where the one end portion of the optical fiber protruding from the fixing portion is inserted through the insertion hole. In this case, for example, when the light sources break down or the like, the light source unit in its entirety can be easily replaced.

In the optical head according to the present disclosure, the window member may face the plurality of light sources such that the light emitted from the plurality of light sources passes therethrough, and may be provided at a position where the light emitted from the plurality of light sources and reflected by the window member is not incident on the optical fiber in an optical axis direction of the optical fiber. In this case, incidence of light reflected by the window member without going through the object on the optical fiber as stray light can be curbed.

In the optical head according to the present disclosure, the window member may be provided in a manner of facing the plurality of light sources such that light emitted from the plurality of light sources passes therethrough. A wavelength region of the light emitted from the plurality of light sources may include a first wavelength region included in a sensitivity region of the photodetector, and a second wavelength region different from the sensitivity region of the photodetector. The window member may reduce a reflectance of the first wavelength region and reduce a transmittance of the second wavelength region. In this case, the object can be efficiently irradiated with components of light from the light sources in the first wavelength region included in the sensitivity region of the photodetector, arrival of components of light from the light sources in the second wavelength region not included in the sensitivity region of the photodetector at the object is curbed, and damage to the object can be curbed.

The optical head according to the present disclosure may further include a circuit board having a main surface and electrically connected to the light sources, and a support member supporting the light source unit and the fixing portion. The light source unit and the fixing portion may be arrayed in a direction toward the second opening from the first opening. The circuit board may be disposed in a manner of facing the light source unit and the fixing portion when viewed in a direction along the main surface. The support member may be formed such that a path from the light source unit toward the circuit board with the support member therebetween is longer than a distance between the circuit board and the light source unit in a direction intersecting the main surface when viewed in a direction along the main surface. In this case, a space is reduced by disposing the circuit board such that it faces the light source unit and the fixing portion using the support member. At this time, since the path reaching the circuit board from the light source unit with the support member therebetween is longer than a direct distance between the light source unit and the circuit board, transfer of heat generated in the light sources to the circuit board can be curbed. Accordingly, malfunction due to heat and deterioration in characteristics are curbed.

The optical head according to the present disclosure may further include a connector provided in the other end portion of the optical fiber and connecting the optical fiber to another optical fiber. In this case, the optical fiber can be easily connected to another optical fiber using the connector.

The optical head according to the present disclosure may further include a connector holding member holding the connector, and a fixing member for fixing the connector holding member to the casing. A long hole may be formed in the connector holding member. The connector holding member may be disposed on a wall portion of the casing such that the long hole lies along an optical axis direction of the optical fiber, and be fixed to the wall portion by the fixing member inserted through the long hole. In this case, positions of the optical fiber, the connector, and the connector holding portion can be easily adjusted in an extending direction of the long hole (that is, the optical axis direction of the optical fiber).

The optical head according to the present disclosure may further include a cap holding the window member. The cap may be disposed on an outward side of the casing and attached to the casing. In this case, the window member can be attached and detached outside the casing.

In the optical head according to the present disclosure, the fixing portion may include the light blocking member covering the one end portion of the optical fiber, inserted through the insertion hole together with the optical fiber, and protruding from the first opening. In this manner, by providing the light blocking member in the fixing portion, when incidence of stray light on the optical fiber is curbed, for example, work of coating the one end portion of the optical fiber with the light blocking member or providing the light blocking member in the holding portion is no longer essential. However, the optical fiber may be coated with the light blocking member, and the light blocking member may be provided in the holding portion.

The optical head according to the present disclosure may further include a spacer detachably attached to the holding portion. A third opening may be formed in the spacer such that the first opening is exposed and the light of each of the plurality of light sources passes therethrough. The window member may be attached to the holding portion in a manner of being interposed between the light sources and the spacer. In this case, while the one end surface of the optical fiber is kept clean by the window member, it can be used in both the state where the spacer is attached and the state where the spacer is detached.

The optical head according to the present disclosure may further include a power source connector attached to the casing in a manner of reaching the inside of the casing from the outside and supplying power to the light sources, and wirings connecting the power source connector and lead wires of the respective light sources. In this case, miniaturization can be achieved compared to when the power source connector and the light sources are connected via the circuit board or the like. Heat generation in the light sources can be restrained by increasing the number of light sources to four or more, for example, and using each of the light sources with low power. In this case, further miniaturization can be achieved without providing a heat sink, a cooling fan, or the like inside the casing. In addition, in this case, the life of the light sources can also be extended.

Advantageous Effects of Invention

According to the present disclosure, it is possible to provide a light source unit capable of curbing incidence of stray light on an optical fiber while effectively propagating light from an object through the optical fiber, and an optical head.

BRIEF DESCRIPTION OF DRAWINGS

FIG. 12 is a graph showing measurement results of a spectrum of the halogen lamp when light absorption in a glass tube is taken into consideration (FIG. 12($a$)) and a graph showing characteristics of a high-pass filter made of an Si material with AR coating (FIG. 12($b$)).

DESCRIPTION OF EMBODIMENT

Hereinafter, an embodiment will be described with reference to the drawings. In each of the drawings, the same reference signs are applied to parts which are the same or corresponding, and duplicate description thereof may be omitted. In addition, in each of the drawings, an orthogonal coordinate system defined by an X axis, a Y axis, and a Z axis may be indicated.

Figure 1:
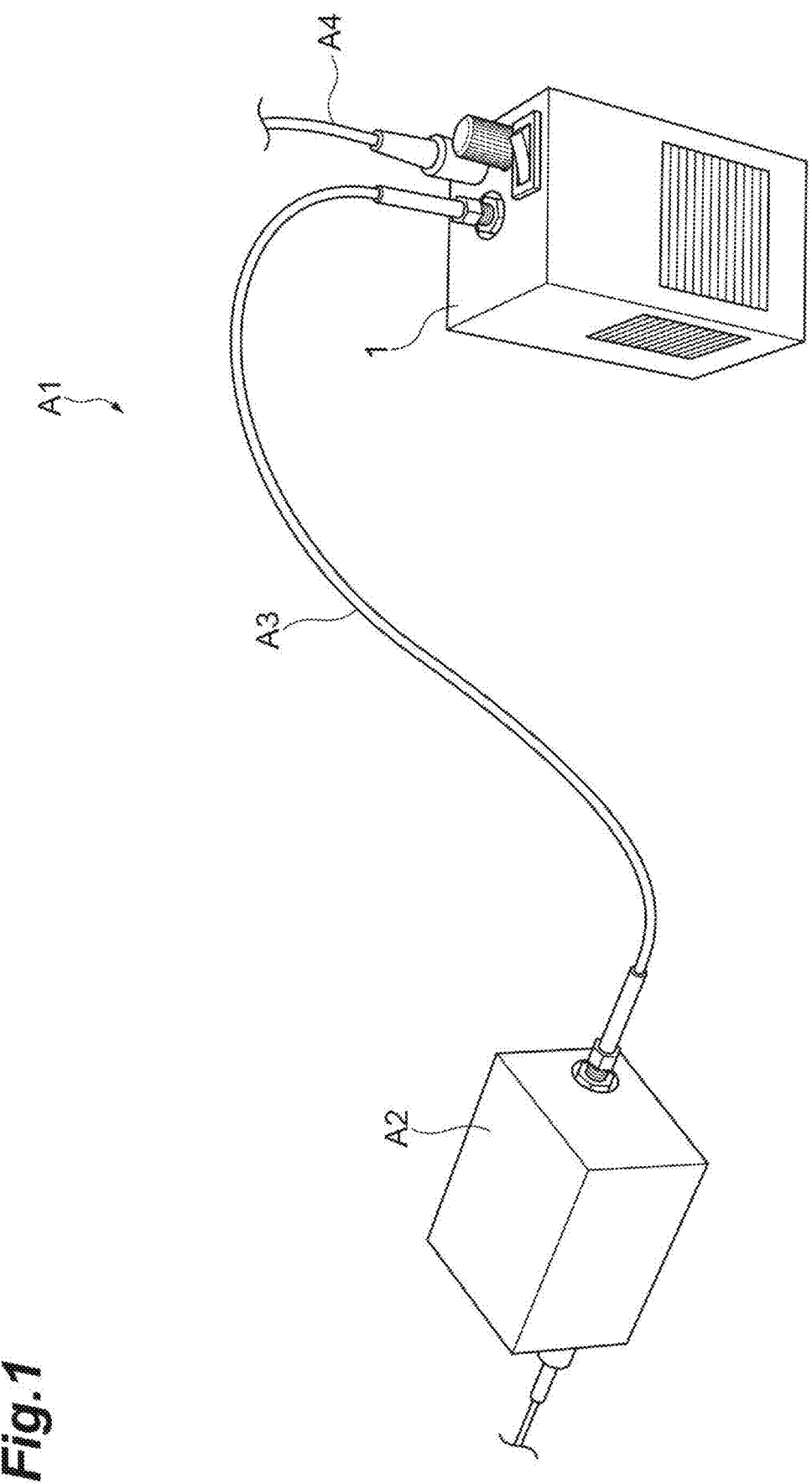
FIG. 1 is a view illustrating a measurement device according to an embodiment.

FIG. 1 is a view illustrating a measurement device according to an embodiment. As illustrated in FIG. 1, a measurement device A1 includes a spectrometer A2 and an optical head 1. For example, the spectrometer A2 is a Fourier transform infrared spectrometer. For example, the spectrometer A2 has an optical interferometer and a control circuit. For example, the optical interferometer includes a light incidence portion, a beam splitter, a fixed mirror, a movable mirror, and a photodetector. The photodetector acquires a light intensity signal which varies depending on the position of the movable mirror. For example, the spectrometer A2 may be connected to a computer such as a PC or the like using a USB or the like.

The optical head 1 is optically connected to the spectrometer A2 through an optical fiber A3. In addition, a power source cable A4 is connected to the optical head 1. The optical head 1 is disposed in the vicinity of an object and irradiates the object with light upon reception of supply of power via the power source cable A4. A part of light used for irradiating an object from the optical head 1 is subjected to regular reflection on particle surfaces constituting the object, and the remaining light enters the inside of the object. The light which has entered the inside of the object is diffused while being repeatedly subjected to refractive transmission, light scattering, and surface reflection inside the object, and a part thereof radiates again from the surface of the object to the outside of the object.

Since this light is repeatedly transmitted through the inside of an object a plurality of times during a process of light diffusion, a diffuse reflectance spectrum thereof is measured in a manner similar to that of a transmission spectrum. Therefore, an object can be analyzed using an absorbance by causing this light to be incident on the optical head 1 and providing it to the spectrometer A2 via the optical fiber A3. In this manner, the optical head 1 irradiates an object with light, and return light from the object is incident thereon and provided to the spectrometer A2 (the photodetector of the spectrometer A2 as well).

Figure 2:
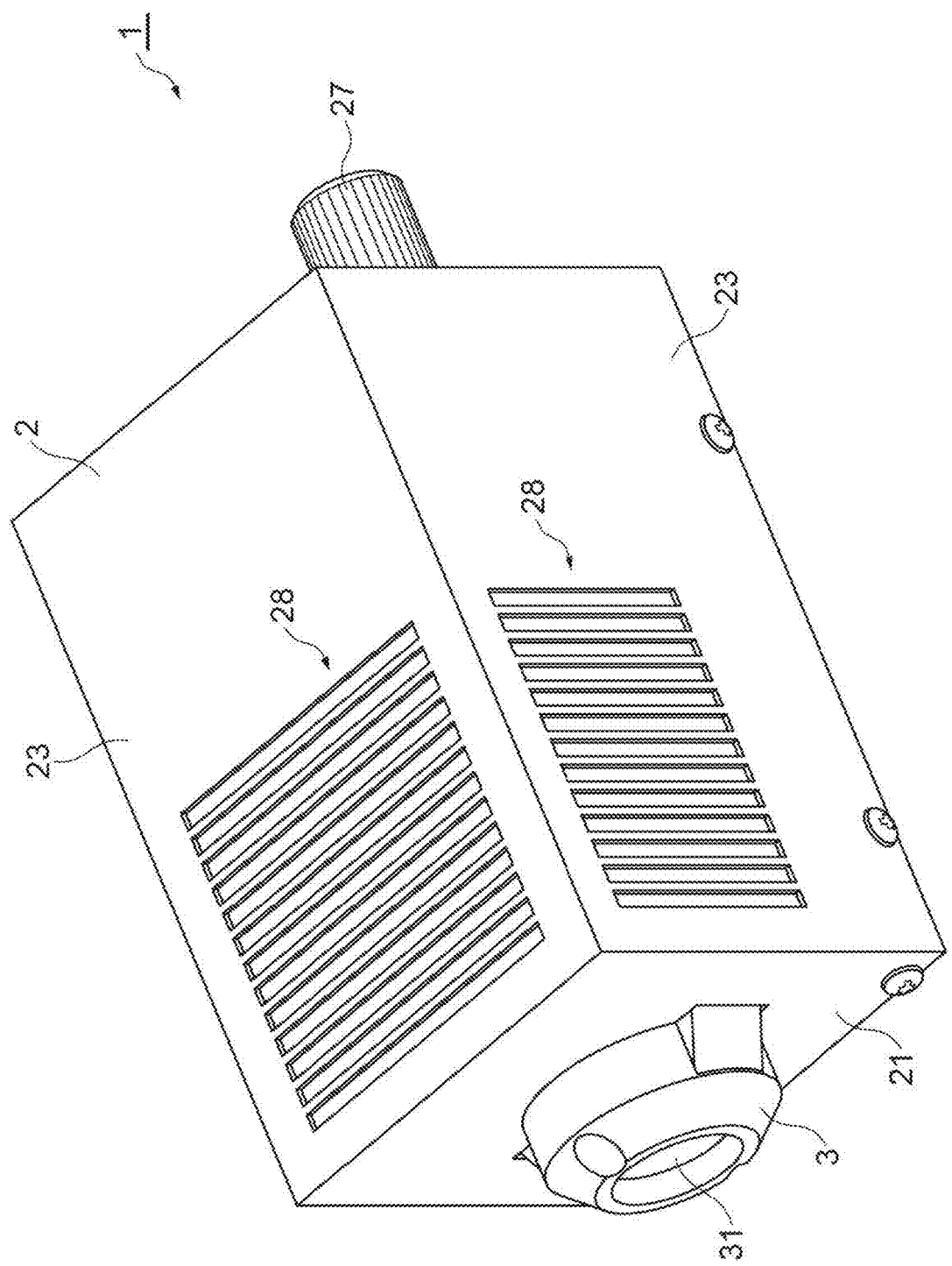
FIG. 2 is a perspective view illustrating an appearance of an optical head illustrated in FIG. 1.
Figure 3:
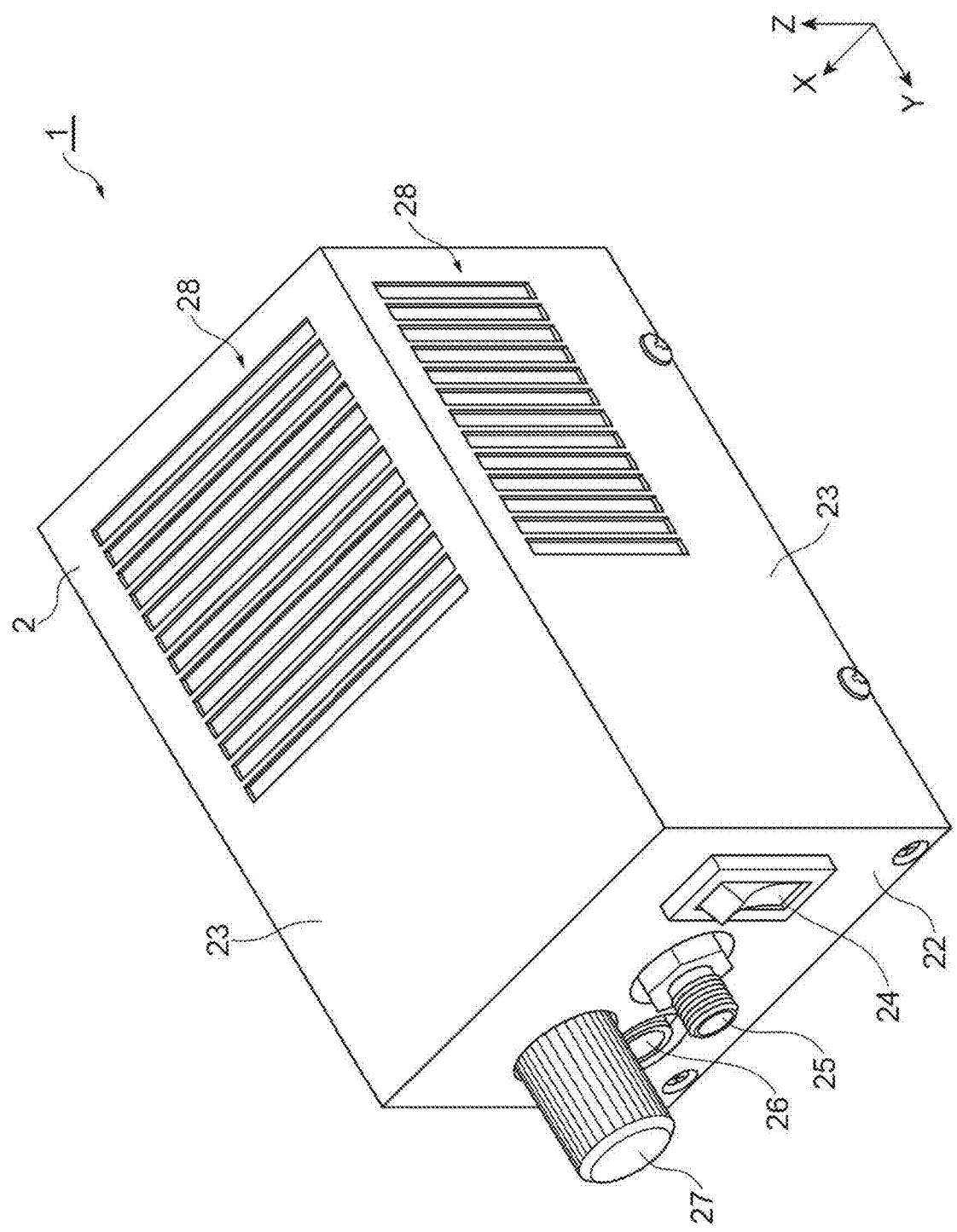
FIG. 3 is a perspective view in another direction illustrating an appearance of the optical head illustrated in FIG. 1.

FIG. 2 is a perspective view illustrating an appearance of the optical head illustrated in FIG. 1. FIG. 3 is a perspective view in another direction illustrating an appearance of the optical head illustrated in FIG. 1. As illustrated in FIGS. 2 and 3, the optical head 1 includes a casing 2, and a cap 3 attached to the casing 2. Here, the casing 2 is formed into a rectangular parallelepiped box. The casing 2 includes a distal end wall portion 21 and a proximal end wall portion 22 facing each other, and four side wall portions 23 connecting the distal end wall portion 21 and the proximal end wall portion 22 to each other. The cap 3 is attached to the distal end wall portion 21.

The proximal end wall portion 22 is provided with a power source switch 24, a connection portion 25 for connecting the optical fiber A3, a connection portion 26 for connecting the power source cable A4, and an adjustment portion (adjustment knob) 27 for adjusting an output of light sources 40 (which will be described below). Here, in three side wall portions 23 of the four side wall portions 23, a vent hole 28 is formed at a position on the distal end wall portion 21 side from the proximal end wall portion 22.

Figure 4:
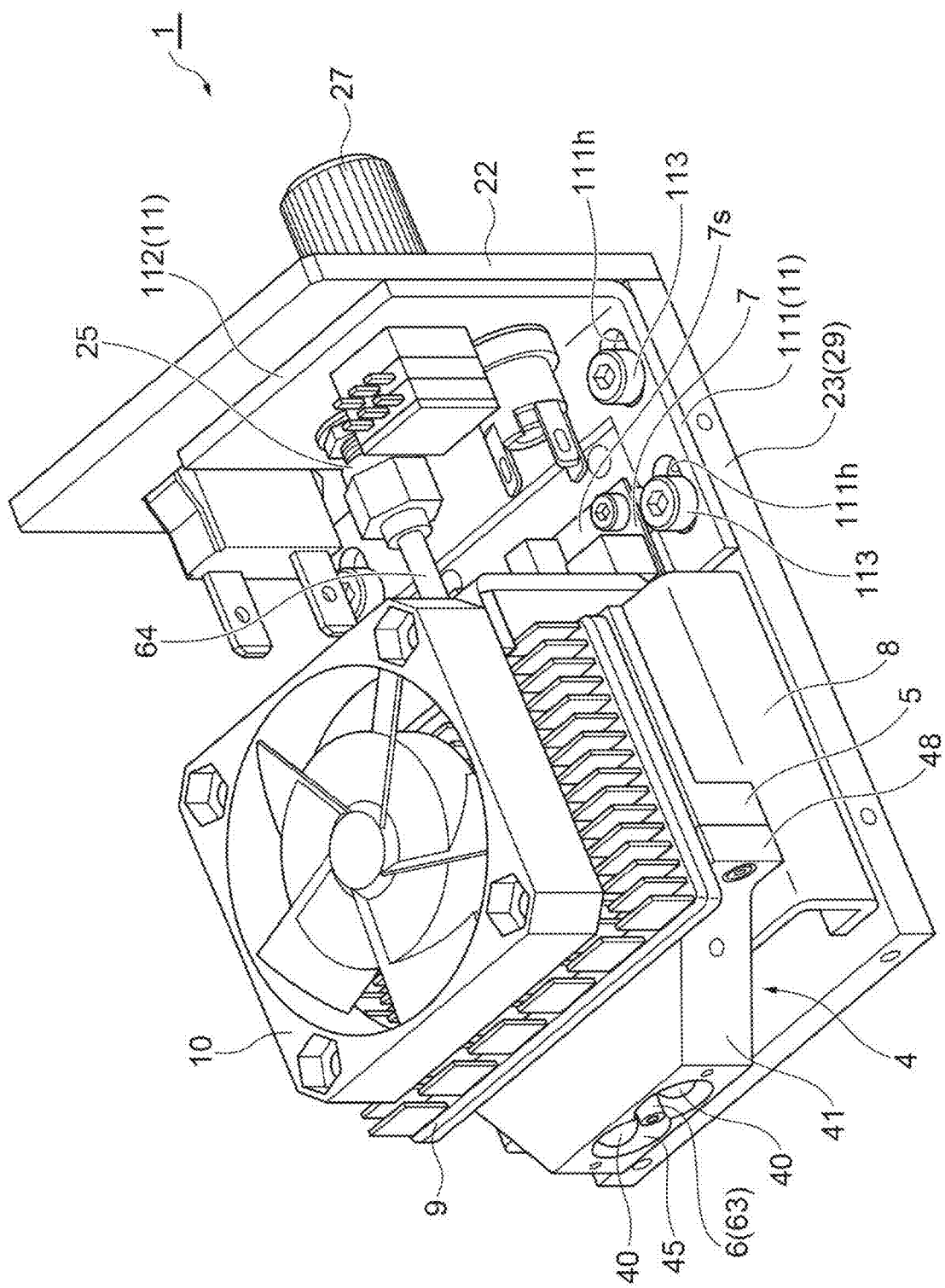
FIG. 4 is a perspective view illustrating a state where a casing is omitted from the optical head illustrated in FIG. 2.
Figure 5:
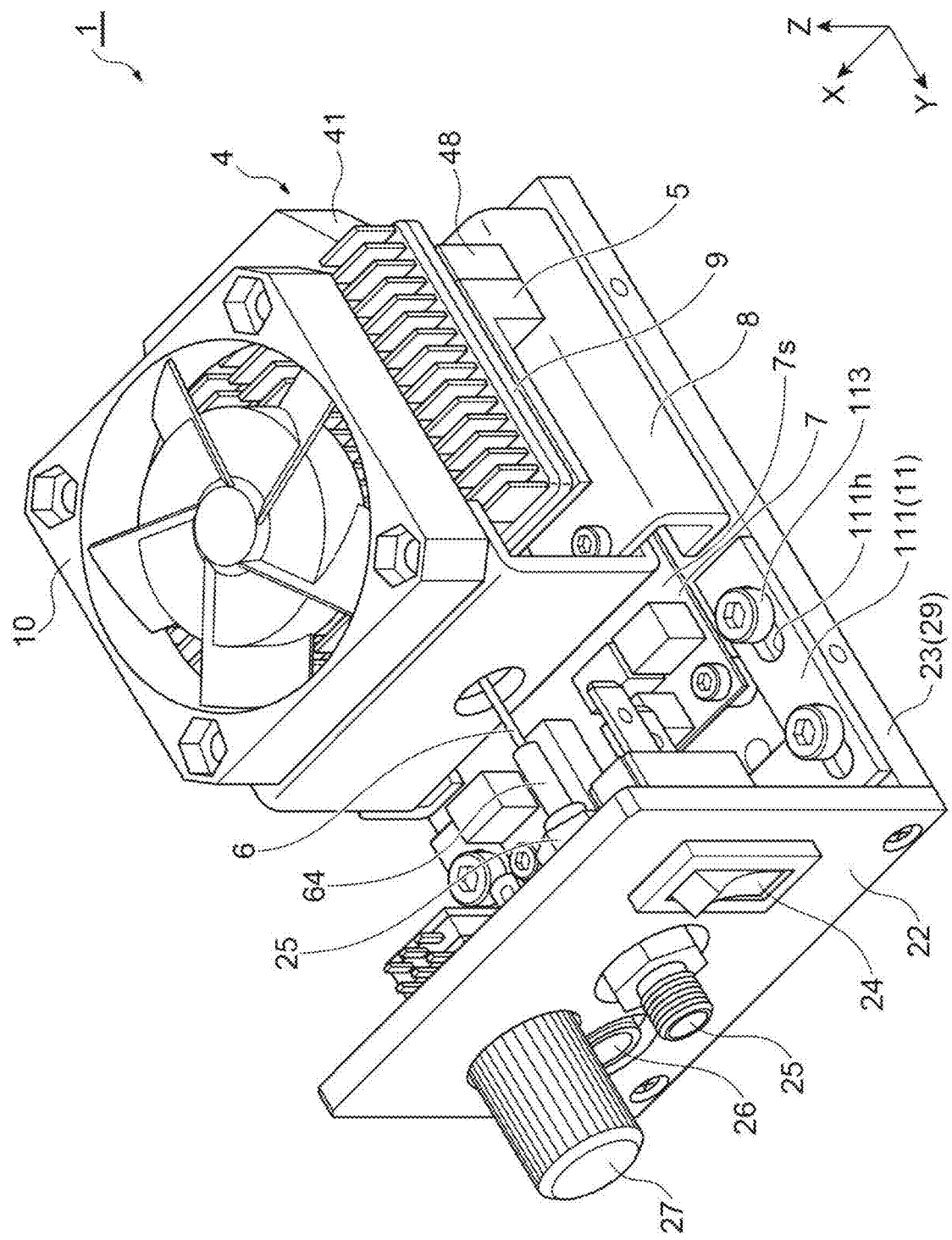
FIG. 5 is another perspective view illustrating a state where the casing is omitted from the optical head illustrated in FIG. 3.
Figure 6:
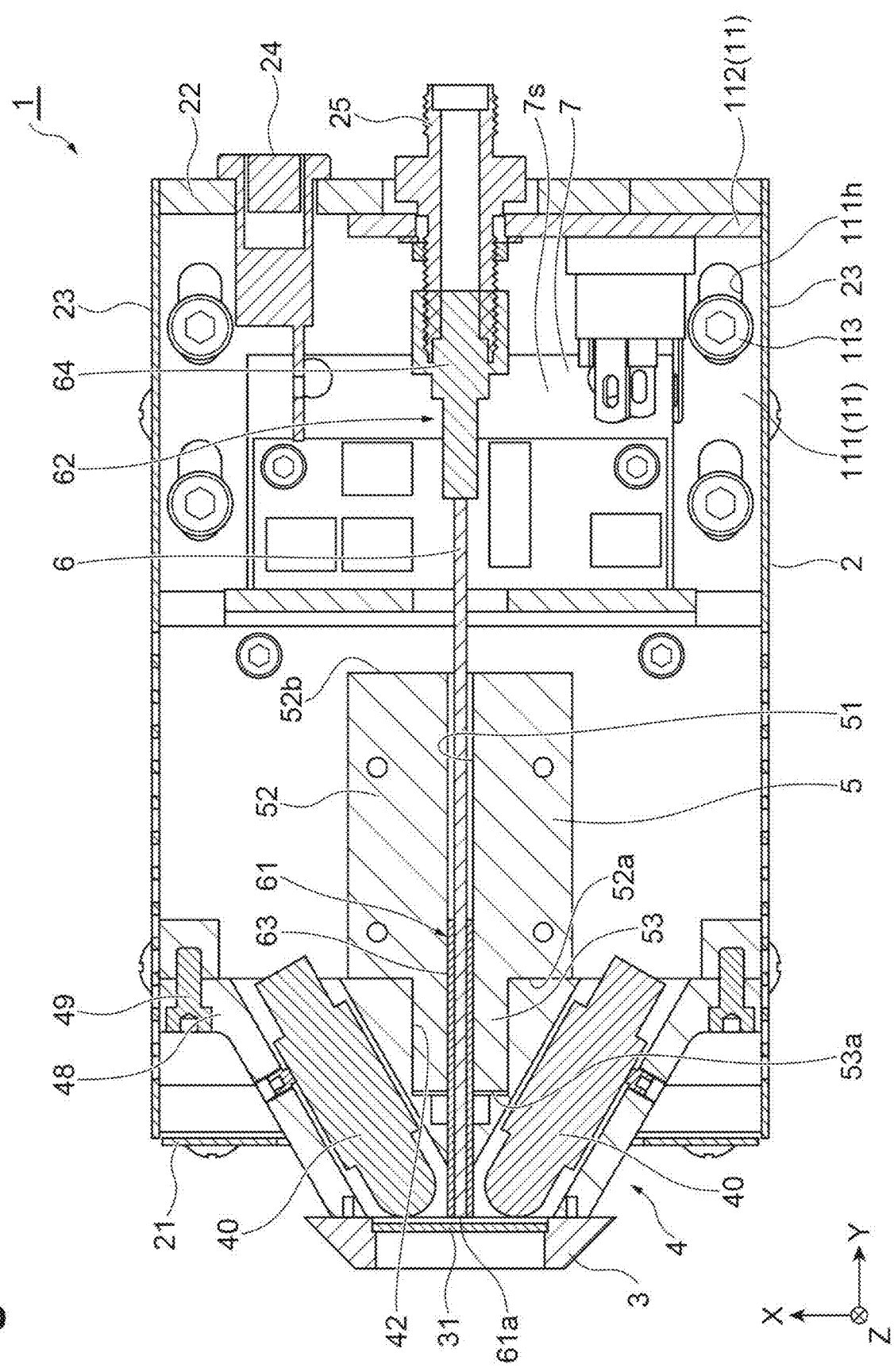
FIG. 6 is a cross-sectional view of the optical head illustrated in FIGS. 1 to 3.
Figure 7:
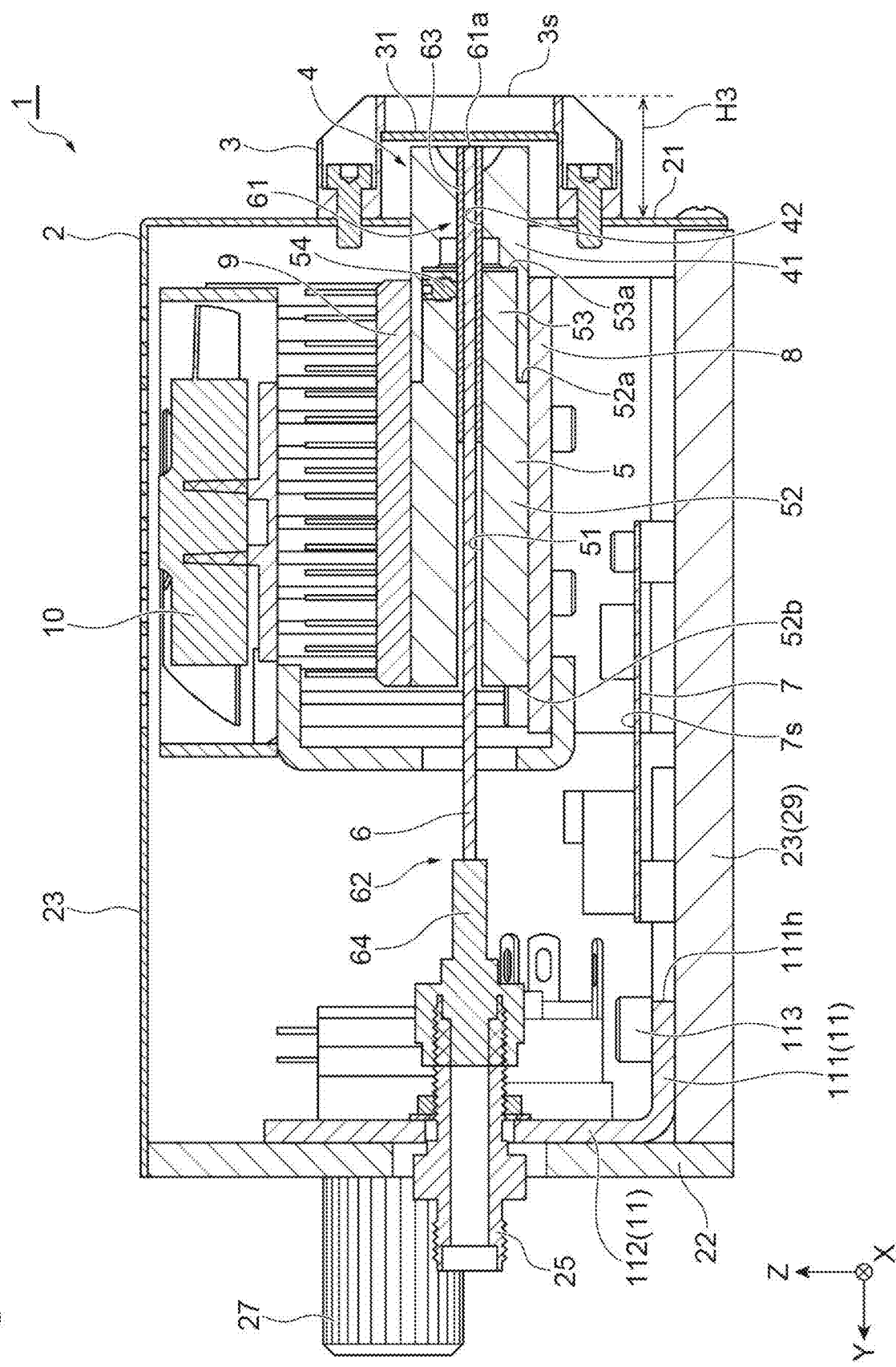
FIG. 7 is another cross-sectional view of the optical head illustrated in FIGS. 1 to 3.

FIG. 4 is a perspective view illustrating a state where a part of the casing is omitted from the optical head illustrated in FIG. 2. FIG. 5 is another perspective view illustrating a state where a part of the casing is omitted from the optical head illustrated in FIG. 3. FIGS. 6 and 7 are cross-sectional views of the optical head illustrated in FIGS. 2 and 3. As illustrated in FIGS. 4 to 7, the optical head 1 has a light source unit 4, a fixing portion 5, an optical fiber 6, a circuit board 7, a support member 8, a heat sink 9, a fan 10, and a holding member 11. A part of the light source unit 4 on the fixing portion 5 side, the fixing portion 5, the optical fiber 6, the circuit board 7, the support member 8, the heat sink 9, the fan and the holding member 11 are accommodated in the casing 2.

The light source unit 4 includes a plurality of light sources 40 and a holding portion 41 holding the plurality of light sources 40. As an example, the light sources 40 are halogen lamps. However, arbitrary light sources can be used as the light sources 40. For example, the light sources 40 may be halogen lamps, tungsten lamps, graphene light sources, or the like as thermal light sources or incandescent light bulbs, or may be light emitting diodes (LED), laser diodes (LD), super luminescent diodes (SLD), vertical cavity surface emitting lasers (VCSEL), or the like as light emitting diodes or semiconductor lasers. Each of the light sources 40 is electrically connected to the circuit board 7. Accordingly, the light sources 40 are turned on and off in response to an operation of the power source switch 24, and the output thereof may be adjusted in response to an operation of the adjustment portion 27. An insertion hole 42 for the optical fiber 6 inserted therethrough is formed in the holding portion 41. Details of the light source unit 4 will be described below.

The fixing portion 5 holds the optical fiber 6 and fixes the position of the optical fiber 6. More specifically, a penetration hole 51 extending in one direction (here, a Y direction) is formed in the fixing portion 5. Therefore, an opening of the penetration hole 51 is formed on both end surfaces intersecting (orthogonal to) the Y direction of the fixing portion Particularly, the fixing portion 5 includes a rectangular plate-shaped base portion 52 having the Y direction (an extending direction of the penetration hole 51) as a longitudinal direction, and a protruding portion 53 provided in a manner of protruding from the base portion 52 in the Y direction.

The base portion 52 includes an end surface 52a intersecting (orthogonal to) the Y direction, and an end surface 52b intersecting (orthogonal to) the Y direction on a side opposite to the end surface 52a. The protruding portion 53 is provided on the end surface 52a in a protruding manner, and the protruding portion 53 includes an end surface 53a intersecting (orthogonal to) the Y direction and facing a side opposite to the base portion 52. Further, the penetration hole 51 opens on the end surface 52b of the base portion 52 and opens on the end surface 53a of the protruding portion 53.

The light source unit 4 and the fixing portion 5 are constituted separately from each other and are arrayed in the Y direction. In this state, the light source unit 4 is fixed to the fixing portion 5, for example, using a fixing member 49 such as a screw.

The optical fiber 6 protrudes from the end surface 52b and the end surface 53a in a state of being inserted through the penetration hole 51, penetrates the protruding portion 53 in a direction intersecting the Y direction, and is pressed and fixed to an inner surface of the penetration hole 51 using a fixing member 54 such as a screw reaching the inside of the penetration hole 51. Therefore, the Y direction that is an extending direction of the penetration hole 51 is an extending direction of the optical fiber 6, and it is also an optical axis direction of the optical fiber 6. One end portion 61 of the optical fiber 6 protrudes from the fixing portion 5 and is inserted through the insertion hole 42 of the holding portion 41 of the light source unit 4. The other end portion 62 of the optical fiber 6 protrudes from the fixing portion 5.

At least the one end portion 61 of the optical fiber 6 is coated with a sleeve 63 while one end surface 61a of the optical fiber 6 is exposed. Here, the sleeve 63 extends in a manner of reaching the one end surface 61a. That is, here, an end portion of the sleeve 63 and the one end surface 61a are flush with each other. For example, the sleeve 63 is a light blocking member made of a metal. The fixing member 54 is disposed in a manner of being in contact with this sleeve 63 when the optical fiber 6 is fixed. A connector 64 for connecting the optical fiber 6 to another optical fiber (for example, the optical fiber A3) is attached to the other end portion 62 of the optical fiber 6.

The circuit board 7 includes a main surface 7s. The circuit board 7 is disposed such that the main surface 7s faces the light source unit 4 and the fixing portion 5 when viewed in the Y direction. That is, the circuit board 7, the light source unit 4, and the fixing portion 5 are stacked in a Z direction that is a direction intersecting (orthogonal to) the main surface 7s when viewed in the Y direction. In this state, the circuit board 7 is attached to a bottom plate 29 while being separated from the bottom plate 29 that is one of the side wall portions 23 of the casing 2.

The support member 8 causes the light source unit 4 and the fixing portion 5 to be separated from the circuit board 7 in the Z direction and supports the light source unit 4 and the fixing portion 5 on the bottom plate 29 and the circuit board 7. The support member 8 is attached to the bottom plate 29. For example, since the fixing portion 5 is supported by the support member 8, the light source unit 4 may be supported by the support member 8 with the fixing portion 5 therebetween. The heat sink 9 is disposed in a manner of being in contact with a surface on a side opposite to a surface of the fixing portion 5 on the circuit board 7 side. The fan 10 is disposed on the heat sink 9. Accordingly, for example, a part of heat generated in the light sources 40 of the light source unit 4 is input to the heat sink 9 via the fixing portion 5 and discharged to the outside by the fan 10.

Here, the holding member 11 is formed into an L-shaped plate. More specifically, the holding member 11 includes a plate-shaped fixing portion 111 extending along the bottom plate 29, and a plate-shaped holding portion 112 extending along the proximal end wall portion 22 of the casing 2 from the fixing portion 111. The holding member 11 comes into contact with the bottom plate 29 in the fixing portion 111 and comes into contact with the proximal end wall portion 22 in the holding portion 112. Further, the holding member 11 is fixed to the bottom plate 29 in the fixing portion 111 and holds the connection portion 25 in the holding portion 112. The connector 64 attached to the other end portion 62 of the optical fiber 6 is attached to the connection portion 25 held by the holding portion 112. That is, the holding member 11 is a connector holding member holding the connector 64 with the connection portion 25 therebetween.

In addition, here, a fixing member 113 for fixing the holding member 11 to the casing 2 is used. A long hole 111h is formed in the fixing portion 111. The holding member 11 is disposed on the bottom plate 29 (wall portion) of the casing 2 such that the long hole 111h lies in the optical axis direction of the optical fiber 6, and it is fixed to the bottom plate 29 by the fixing member 113 inserted through the long hole 111h.

The cap 3 includes a light transmissive window member 31 disposed in a manner of facing the one end surface 61a of the optical fiber 6 and the light sources 40 as illustrated in FIG. 6, and it is fixed to the distal end wall portion 21 of the casing 2, for example, using a fixing member 32 such as a screw, as illustrated in FIG. 7.

Figure 8:
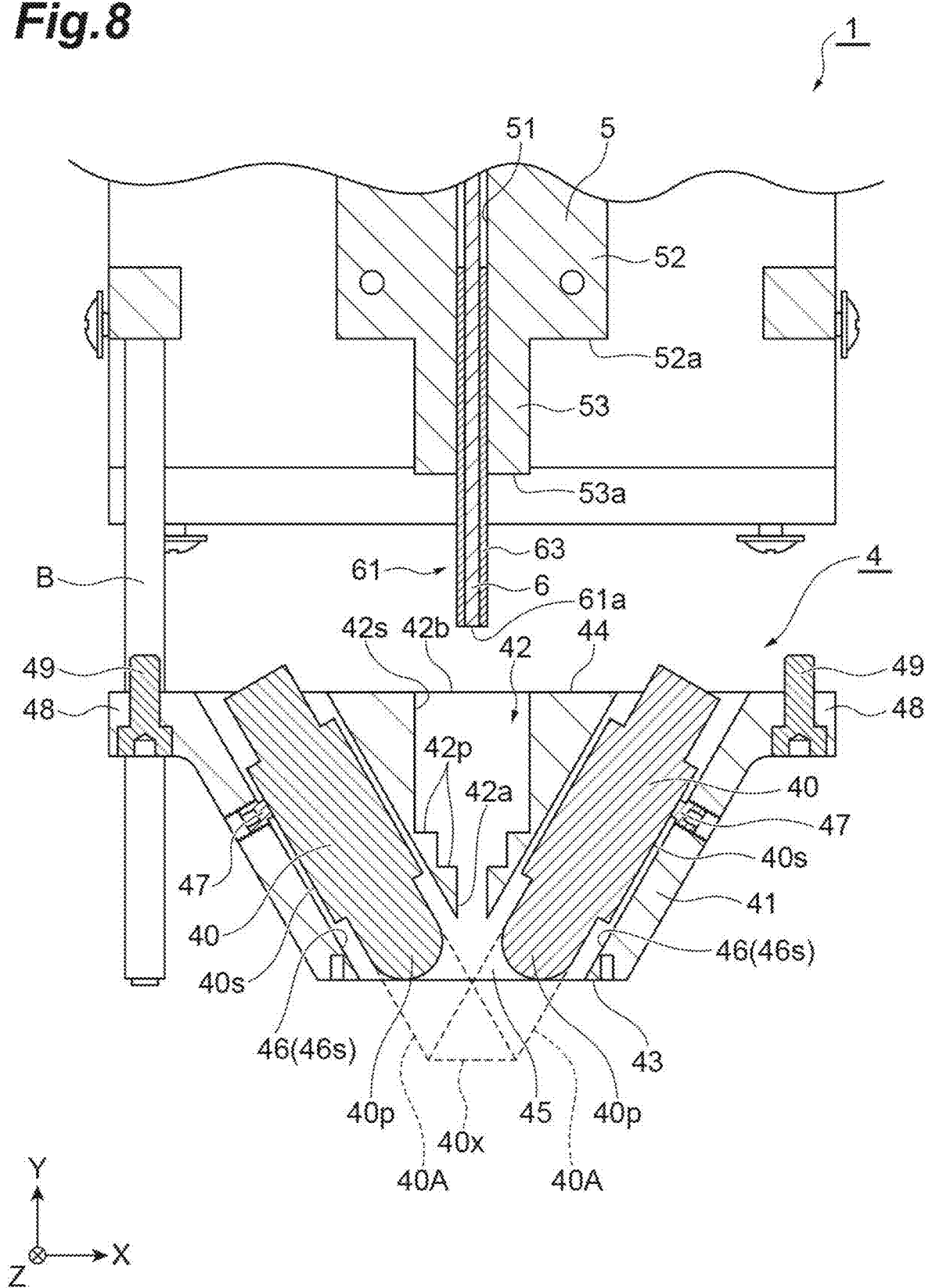
FIG. 8 is an enlarged cross-sectional view of a light source unit illustrated in FIGS. 6 and 7.

Subsequently, details of the light source unit will be described. FIG. 8 is an enlarged cross-sectional view of the light source unit illustrated in FIGS. 6 and 7. FIG. 8 illustrates a state where the light source unit 4 is detached from the fixing portion 5. As illustrated in FIGS. 6 to 8, and as described above, the light source unit 4 includes the plurality of light sources 40, and the holding portion 41 holding the light sources 40. The holding portion 41 is formed into a trapezoidal plate shape when viewed in the Z direction. More specifically, the holding portion 41 is formed into a trapezoidal shape decreasing as it goes away from the fixing portion 5 when viewed in the Z direction.

The holding portion 41 includes an end surface 43 intersecting (orthogonal to) the Y direction and facing a side opposite to the fixing portion 5, and an end surface 44 intersecting (orthogonal to) the Y direction and facing the fixing portion 5 side. In addition, a recessed portion 45 opening on the end surface 43, and a plurality of hole portions 46 opening on the end surface 44 and connected to the recessed portion are formed in the holding portion 41. The light sources 40 are disposed in the plurality of respective hole portions 46. Therefore, the number of hole portions 46 is the same as at least the number of light sources 40. The hole portions 46 are inclined in a manner of approaching the center axis of the holding portion 41 (here, the optical axis of the optical fiber 6) in the Y direction from the end surface 44 toward the end surface 43.

The light sources 40 penetrate the holding portion 41 and are pressed and fixed to inner surfaces 46s of the hole portions 46 using fixing members 47 such as screws reaching the insides of the hole portions 46. That is, the holding portion 41 holds the light sources 40 in a state where outer surfaces 40s of the light sources 40 are brought into contact with the inner surfaces 46s of the hole portions 46. The inner surfaces 46s of the hole portions 46 have shapes along the shapes of the outer surfaces of the light sources 40 in parts coining into contact with at least the outer surfaces 40s of the light sources 40.

As an example, here, the outer surfaces 40s of the light sources have cylindrical shapes, and the inner surfaces 46s of the hole portions 46 have cylindrical shapes having larger diameters than the outer surfaces of the light sources 40. Here, although parts between the inner surfaces 46s of the hole portions 46 and the outer surfaces 40s of the light sources 40 are voids, the light source unit 4 may have resin portions filling the spaces between the inner surfaces 46s of the hole portions 46 and the outer surfaces 40s of the light sources 40.

Here, the insertion hole 42 having the optical fiber 6 inserted therethrough is connected to the recessed portion 45, has an opening (first opening) inside the recessed portion 45, and has an opening (second opening) 42b on the end surface 44. In this manner, both the insertion hole 42 and the hole portions 46 open inside the recessed portion 45. Further, in each of the light sources 40, a light emission portion 40p thereof is disposed inside the recessed portion 45, and the light emission portion 40p is disposed inside the hole portion 46 in a manner of facing a side opposite to the fixing portion 5. That is, the holding portion 41 holds the plurality of light sources 40 such that an irradiation region 40A of light of each of the plurality of light sources 40 is formed on one side of the holding portion 41 (a side opposite to the fixing portion 5). The irradiation region 40A is a region irradiated with light emitted from each of the light sources 40 (light emission portions 40p).

Therefore, an opening 42a of the insertion hole 42 is an opening facing the irradiation region 40A, and the one end surface 61a of the optical fiber 6 inserted through the insertion hole 42 faces the irradiation region 40A. In this manner, the insertion hole 42 is formed in the holding portion 41 such that the one end surface 61a of the optical fiber 6 is exposed from the opening 42a and faces the irradiation region 40A when the optical fiber 6 is inserted therethrough. Particularly, here, the insertion hole 42 is formed such that the one end surface 61a of the optical fiber 6 protrudes from the opening 42a when the optical fiber 6 is inserted therethrough. Moreover, in the light source unit 4, when the optical fiber 6 is inserted through the insertion hole 42, the one end portion 61 including the one end surface 61a of the optical fiber 6 is positioned between the plurality of light sources 40 with a sleeve (light blocking member) 63 therebetween. As an example, in a state where the optical fiber 6 is inserted through the insertion hole 42, end portions of the light sources 40 on the end surface 43 side and the one end surface 61a of the optical fiber 6 are flush with each other.

A flat surface portion 42p intersecting (orthogonal to) the Y direction is formed on an inner surface 42s of the insertion hole 42. The end surface 53a of the protruding portion 53 of the fixing portion 5 abuts this flat surface portion 42p when the light source unit 4 is attached to the fixing portion 5 while the optical fiber 6 is inserted through the insertion hole 42. In addition, similarly, when the light source unit 4 is attached to the fixing portion 5, the end surface 52a of the base portion 52 of the fixing portion 5 abuts the end surface 44 of the holding portion 41. That is, the holding portion 41 includes a flat surface portion intersecting a direction toward the opening 42b from the opening 42a of the insertion hole 42 (Y direction), and the flat surface portion is formed on at least one of (here, both) the end surface 44 of the holding portion 41 having the opening 42b formed therein and the inner surface 42s of the insertion hole 42.

Here, a flange portion 48 is formed in the holding portion 41. Further, the holding portion 41 is fixed to the fixing portion 5 by the fixing member 49 inserted through the flange portion 48. In addition, a hole portion having a position-setting pin B inserted therethrough is formed in the flange portion 48.

This position-setting pin B is used when the light source unit 4 is attached to the fixing portion 5. That is, when the light source unit 4 is attached to the fixing portion 5, the position-setting pin B is attached to the fixing portion 5 in advance. In addition, the fixing portion 5 holds the optical fiber 6 in a state where the one end portion 61 of the optical fiber 6 protrudes from the end surface 53a of the protruding portion 53. In this state, the position-setting pin B is inserted through the hole portion of the flange portion 48. Further, the light source unit 4 is caused to slide along the position-setting pin B such that the optical fiber 6 is inserted through the insertion hole 42 of the holding portion 41, and it is brought into contact with the fixing portion 5.

Thereafter, the light source unit 4 is attached to the fixing portion 5 by fixing the flange portion 48 to the fixing portion 5 using the fixing member 49. Thereafter, the position-setting pin B is detached. In this manner, the light source unit 4 is detachably attached to the fixing portion in a state where the one end portion 61 of the optical fiber 6 protruding from the fixing portion 5 is inserted through the insertion hole 42. In addition, when it is attached, the position within a plane intersecting the Y direction is uniformly maintained by the position-setting pin B. Therefore, when there is a need to replace the light source 40, only the light source 40 can be detached and replaced, but the light source unit 4 in its entirety can be replaced by easily and accurately detaching and attaching it.

Figure 9:
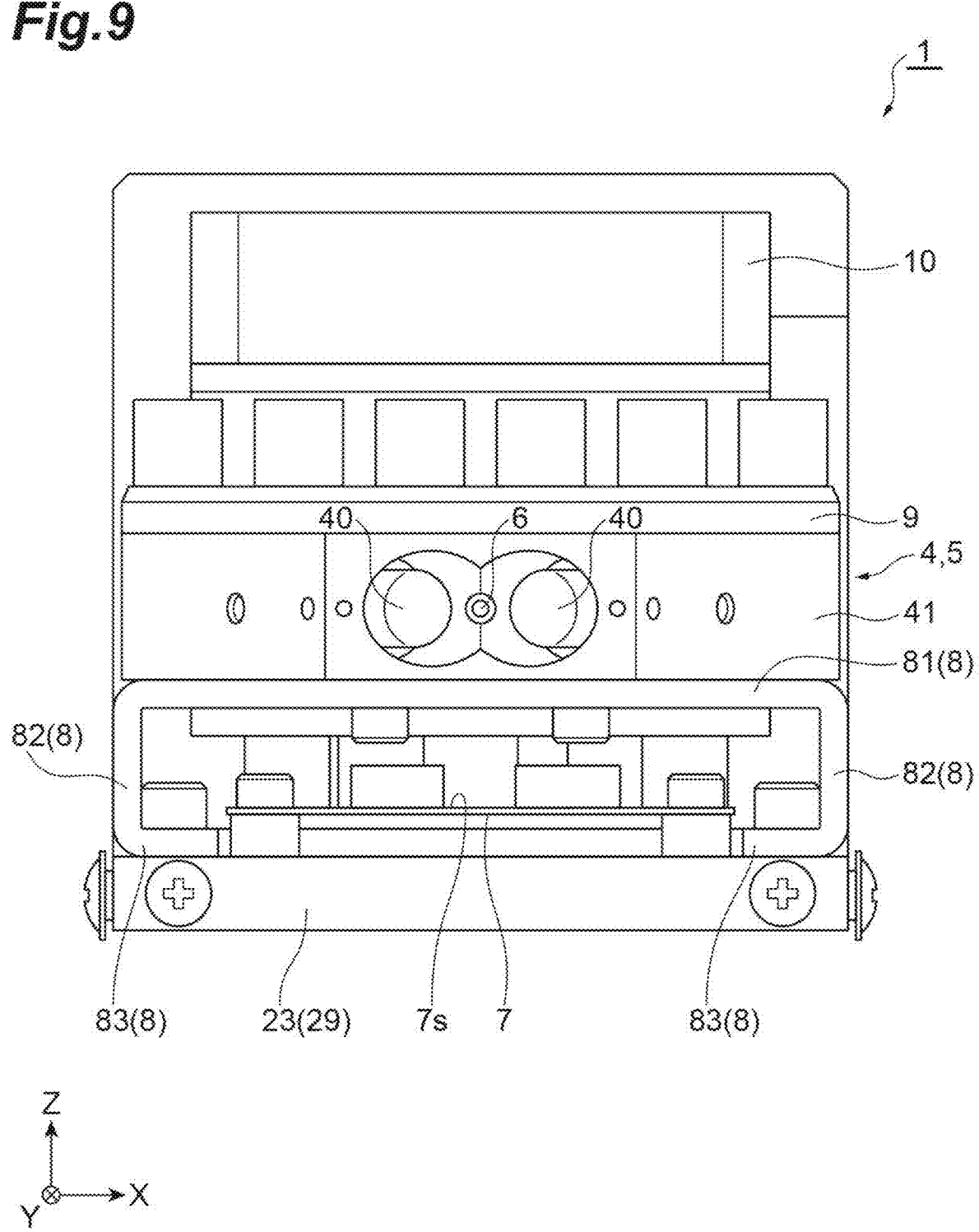
FIG. 9 is a front view of the optical head illustrated in FIGS. 1 to 3.

As illustrated in FIG. 9, when viewed in a direction along the main surface 7s of the circuit board 7 (here, the Y direction), the light source unit 4 as described above is supported by the support member 8 in a manner of facing the circuit board 7 together with the fixing portion 5. Particularly, when viewed in the Y direction, the support member 8 is formed such that a path from the light source unit 4 toward the circuit board 7 with the support member 8 therebetween is longer than a distance between the circuit board 7 and the light source unit 4 in a direction intersecting the main surface 7s (here, the Z direction).

More specifically, the support member 8 is formed into a C-shaped plate when viewed in the Y direction by a flat plate-shaped first part 81 which extends along the main surface 7s and in which the light source unit 4 and the fixing portion 5 are placed, a flat plate-shaped second part 82 which extends from both end portions of the first part 81 toward the bottom plate 29 in the Z direction, and a flat plate-shaped third part 83 which extends along the inside of the main surface 7s from a part on a side opposite to a connection portion in the second part 82 with respect to the first part 81 and is fixed to the bottom plate 29. Further, the circuit board 7 is disposed inside a space surrounded by the first part 81, the second part 82, and the third part 83. Accordingly, a path from the light source unit 4 toward the circuit board 7 via each part of the support member 8 is longer than a direct distance between the light source unit 4 and the circuit board 7.

Figure 10:
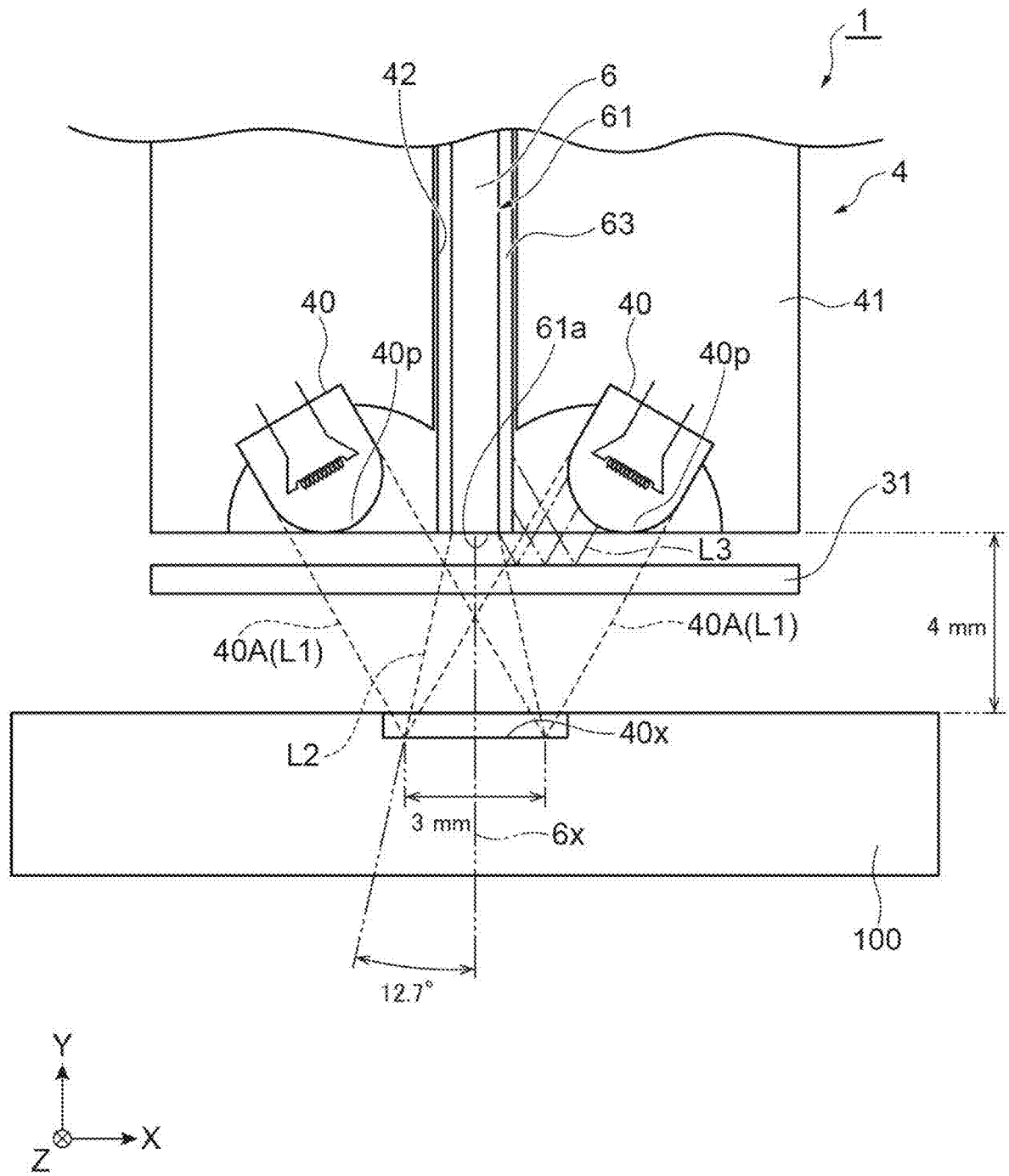
FIG. 10 is an explanatory schematic view of a positional relationship among light sources, an optical fiber, and a window member.

FIG. 10 is an explanatory schematic view of a positional relationship among the light sources, the optical fiber, and the window member. In FIG. 10, in order to facilitate understanding of the positional relationship of each part, the structure of the light source unit 4 is schematized. As illustrated in FIG. 9, the window member 31 is disposed such that it faces the one end surface 61a of the optical fiber 6 and the light emission portions 40p of the light sources 40 and light emitted from the light emission portions 40p of the light sources 40 passes therethrough. Therefore, light L1 that is a part of light emitted from the light emission portions 40p of the light sources 40 is transmitted through the window member 31, and an object 100 is irradiated therewith.

The plurality of light sources 40 are held by the holding portion 41 such that the irradiation regions 40A of this light L1 overlap each other. Further, in the optical fiber 6, an optical axis 6x thereof passes through an overlapping region 40x where the irradiation regions 40A overlap each other. In other words, when the optical fiber 6 is inserted therethrough, the insertion hole 42 is formed such that the optical axis 6x of the optical fiber 6 passes through the overlapping region 40x where the irradiation regions 40A of the plurality of light sources 40 overlap each other.

Moreover, here, a bottom surface of a truncated cone L2 extending from an edge of the one end surface 61a of the optical fiber 6 at the largest light receiving angle and the overlapping region 40x coincide with each other. As an example, when the core diameter of the optical fiber 6 is 600 μm, the NA is 0.22, the inclination angles of the light sources 40 are 30 degrees, and the irradiation sizes of the light sources 40 (for example, the diameters of the light emission portions 40p) are 2.58 mm, the sizes of the overlapping region 40x and a bottom surface L2s become approximately 3 mm and coincide with each other at a position where the distance from the one end surface 61a of the optical fiber 6 is 4 mm and penetration of the light L1 into the object 100 is 0.5 mm.

Meanwhile, light L3 that is another part of light emitted from the light emission portions 40p of the light sources 40 is subjected to regular reflection on a surface of the window member 31 on the light source unit 4 side. The window member 31 is provided at a position where the light L3 subjected to regular reflection in this window member 31 is not incident on the one end surface 61a of the optical fiber 6 in the optical axis direction of the optical fiber 6. The light L3 is blocked by the sleeve 63 that is a light blocking member.

Figure 11:
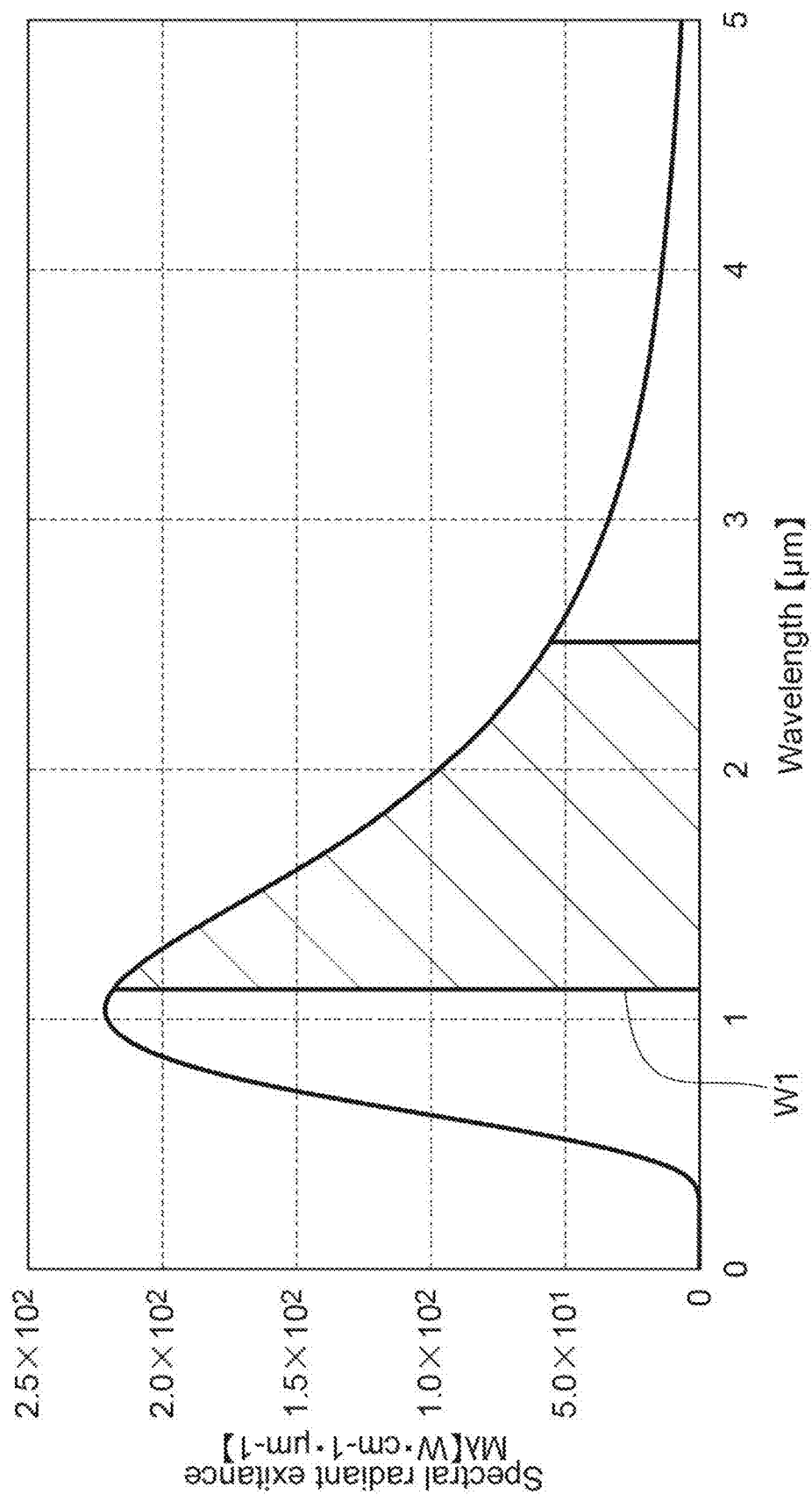
FIG. 11 is a graph showing a spectral radiant exitance of a halogen lamp at 2,800 K (on the assumption of emissivity $\varepsilon=1$) calculated based on Planck's law of distribution.

FIG. 11 is a graph showing a spectral radiant exitance of a halogen lamp at 2,800 K (on the assumption of emissivity $\varepsilon=1$) calculated based on Planck's law of distribution. As illustrated in FIG. 11, the halogen lamp emits a light energy in a wider wavelength region than a sensitivity region W1 of the spectrometer A2 (a sensitivity region of the photodetector of the spectrometer A2). A light energy input to an object is converted into heat in accordance with the absorption coefficient of the object. For this reason, when halogen lamps or the like are used as the light sources 40, it is desirable to cut light in wavelength regions other than the sensitivity region W1.

On the other hand, a glass tube is provided in actual halogen lamps. FIG. 12(a) is a graph showing measurement results of a spectrum of the halogen lamp when light absorption in a glass tube is taken into consideration. In the graph of FIG. 12(a), the numerical values in the vertical axis are normalized with the largest value at a wavelength of 2 μm or longer. As illustrated in FIG. 12(a), due to light absorption of the glass tube, light having a wavelength of 2.8 μm or longer is unlikely to be emitted from the halogen lamp. That is, it is conceivable that light on a longer wavelength side than that in the sensitivity region W1 be sufficiently cut by the glass tube.

From such a viewpoint, the window member 31 has a function of cutting light on a shorter wavelength side than that in the sensitivity region W1. Moreover, the window member 31 has a function of preventing reflection of light having a wavelength included in the sensitivity region W1. As an example, when the light sources 40 are halogen lamps and the sensitivity region W1 is 1,100 nm to 2,500 nm, in order to have the foregoing functions, the window member 31 may be made of an Si material with AR coating. FIG. 12(b) is a graph showing characteristics of a high-pass filter made of an Si material with AR coating. When the spectrum of the halogen lamp in FIG. 12(a) and the characteristics of the filter in FIG. 12(b) are combined, it is understood that the object 100 can be favorably irradiated with light having a wavelength of 1,100 nm to 2,500 nm by having the window member 31 made of an Si material with AR coating.

In this manner, when the wavelength region of light emitted from the plurality of light sources 40 includes a first wavelength region included in the sensitivity region W1 of the spectrometer A2 (the photodetector of the spectrometer A2) and a second wavelength region different from the sensitivity region W1 of the spectrometer A2, the window member 31 may be constituted to reduce the reflectance of the first wavelength region and reduce the transmittance of the second wavelength region.

The cap 3 holding the window member 31 as described above is disposed on the outward side of the casing 2 and attached to the casing 2 as described above. Further, as illustrated in FIG. 7, a thickness H3 of the cap 3 in the Y direction defines the distance from the one end surface 61a of the optical fiber 6 to the object 100 when the cap 3 is brought into contact with the object 100. As an example, the thickness H3 of the cap 3 may be determined such that an end surface 3s on a side opposite to the casing 2 of the cap 3 is at a position where the bottom surface of the truncated cone L2 extending from the edge of the one end surface 61a of the optical fiber 6 at the largest light receiving angle and the overlapping region 40x coincide with each other (or a position on the casing 2 side by an amount of penetration of the light L1 into the object 100 from the position). Consequently, the distances between the light sources 40, the one end surface 61a of the optical fiber 6, and the object 100 can be easily and appropriately set by bringing the end surface 3s of the cap 3 into contact with the object 100.

As described above, in the light source unit 4 according to the present embodiment, the insertion hole 42 having the optical fiber 6 inserted therethrough is formed with respect to the holding portion 41 holding the plurality of light sources 40. Particularly, when the optical fiber 6 is inserted through the insertion hole 42, the one end portion 61 including the one end surface 61a of the optical fiber 6 is positioned between the plurality of light sources 40 with the light blocking member (the sleeve 63) therebetween. Therefore, since the one end surface 61a of the optical fiber 6 can also be brought closer to the object 100 by disposing the light source unit 4 such that the light sources 40 become closer to the object 100, feeble light from the object 100 can be effectively propagated through the optical fiber 6. Moreover, since the light blocking member is interposed between the light sources 40 and the one end portion 61 of the optical fiber 6, incidence of stray light on the optical fiber 6 can be curbed.

In addition, in the light source unit 4, the holding portion 41 includes the flat surface portion (the flat surface portion 42p and the end surface 44) intersecting a direction toward the opening 42b from the opening 42a, and the flat surface portion is formed on at least one of (here, both) the end surface 44 of the holding portion 41 having the opening 42b formed therein and the inner surface 42s of the insertion hole 42. For this reason, when the optical fiber 6 is inserted through the insertion hole 42, the optical fiber 6 can be positionally set in a direction toward the opening 42b from the opening 42a (that is, the optical axis direction of the optical fiber 6 in a state of being inserted through the insertion hole 42, here, the Y direction), for example, by causing another member (the fixing portion 5) holding the optical fiber 6 to abut the flat surface portion of the holding portion 41.

In addition, in the light source unit 4, the holding portion 41 holds the plurality of light sources 40 such that the irradiation regions 40A of the plurality of respective light sources 40 overlap each other, and the insertion hole 42 is formed such that the optical axis 6x of the optical fiber 6 passes through the overlapping region 40x where the irradiation regions of the plurality of light sources 40 overlap each other when the optical fiber 6 is inserted therethrough. For this reason, the intersection where the irradiation regions 40A of the plurality of light sources 40 and the optical axis 6x of the optical fiber 6 inserted through the insertion hole 42 intersect each other is formed. Therefore, light from the object 100 can be effectively incident on the optical fiber 6 by disposing the light source unit 4 such that the object 100 can be aligned with this intersection.

In addition, in the light source unit 4, the hole portions 46 for disposing the plurality of light sources 40 are formed in the holding portion 41. The holding portion 41 holds the plurality of light sources 40 in a state where the outer surfaces 40s of the plurality of light sources are in contact with the inner surfaces 46s of the hole portions 46. At least parts on the inner surfaces 46s of the hole portions 46 coining into contact with the outer surfaces 40s of the plurality of light sources 40 are formed into shapes along shapes of the outer surfaces 40s of the light sources 40. For this reason, contact areas between the inner surfaces 46s of the hole portions 46 and the light sources 40 can be increased, and heat can effectively dissipate from the light sources 40 to the holding portion 41.

In addition, in the light source unit 4, the holding portion 41 may include resin portions filling spaces between the inner surfaces 46s of the hole portions 46 and the outer surfaces 40s of the light sources 40. In this case, heat can more effectively dissipate from the light sources 40 to the holding portion 41. Here, the holding portion 41 holds two light sources 40 such that the two light sources 40 are disposed on a straight line orthogonal to the optical axis 6x of the optical fiber 6.

Here, the optical head 1 according to the present embodiment irradiates the object 100 with light and provides light from the object 100 to the spectrometer A2 (the photodetector of the spectrometer A2 as well). The optical head 1 includes the light source unit 4; the fixing portion 5 holding the optical fiber 6 and fixing the position of the optical fiber 6; the optical fiber 6 inserted through the insertion hole 42 while being fixed to the fixing portion 5; the casing 2 accommodating at least a part of the light source unit 4, the fixing portion 5, and the optical fiber 6; and the light transmissive window member 31 disposed in a manner of facing the one end surface 61a of the optical fiber 6.

The optical head 1 includes the foregoing light source unit 4. Therefore, it is possible for effects similar to those of the foregoing light source unit 4 to be exhibited. Moreover, the optical head 1 includes the window member 31 disposed in a manner of facing the one end surface 61a of the optical fiber 6. Therefore, the one end surface 61a of the optical fiber 6 can be kept clean. As described above, according to the light source unit 4, since the one end surface 61a of the optical fiber 6 can be brought even closer to the object 100, fouling of the one end surface 61a of the optical fiber 6 is more effectively prevented by the window member 31.

In addition, the optical head 1 includes the sleeve 63 provided in the optical fiber 6 such that at least the one end portion 61 of the optical fiber 6 is coated therewith while the one end surface 61a is exposed. In this manner, by providing the light blocking member in the optical fiber 6, when the incidence of stray light on optical fiber 6 is curbed, work of providing the light blocking member in the holding portion 41 of the light source unit 4 is no longer essential. However, the light blocking member may be provided in the holding portion 41.

In addition, in the optical head 1, the light source unit 4 and the fixing portion 5 are formed separately from each other. The fixing portion 5 holds the optical fiber 6 in a state where the one end portion 61 of the optical fiber 6 protrudes from the fixing portion 5. The light source unit 4 is detachably attached to the fixing portion 5 in a state where the one end portion 61 of the optical fiber 6 protruding from the fixing portion 5 is inserted through the insertion hole 42. For this reason, for example, when the light sources 40 break down or the like, the light source unit 4 in its entirety can be easily replaced.

In addition, in the optical head 1, the window member 31 faces the plurality of light sources 40 such that the light L1 emitted from the plurality of light sources 40 passes therethrough, and is provided at a position where the light L3 emitted from the plurality of light sources 40 and reflected by the window member 31 is not incident on the optical fiber 6 in the optical axis direction of the optical fiber 6. For this reason, incidence of the light L3 reflected by the window member 31 without going through the object 100 on the optical fiber 6 as stray light can be curbed.

In addition, in the optical head 1, the window member 31 is provided in a manner of facing the plurality of light sources 40 such that light emitted from the plurality of light sources 40 passes therethrough. The wavelength region of light emitted from the plurality of light sources 40 includes the first wavelength region included in the sensitivity region of a photodetector W1, and the second wavelength region different from the sensitivity region of the photodetector W1. The window member 31 reduces the reflectance of the first wavelength region and reduces the transmittance of the second wavelength region. For this reason, the object 100 can be efficiently irradiated with the components of light from the light sources 40 in the first wavelength region included in the sensitivity region of the photodetector W1, arrival of the components of light from the light sources 40 in the second wavelength region not included in the sensitivity region of the photodetector W1 at the object 100 is curbed, and damage to the object 100 can be curbed.

In addition, the optical head 1 includes the circuit board 7 having the main surface 7s and electrically connected to the light sources 40, and the support member 8 supporting the light source unit 4 and the fixing portion 5. The light source unit 4 and the fixing portion 5 are arrayed in a direction toward the opening 42b from the opening 42a (Y direction). The circuit board 7 is disposed in a manner of facing the light source unit 4 and the fixing portion 5 when viewed in a direction along the main surface 7s (for example, the Y direction). The support member 8 is formed such that the path from the light source unit 4 toward the circuit board 7 with the support member 8 therebetween is longer than the distance between the circuit board 7 and the light source unit 4 in a direction intersecting the main surface 7s (for example, the Z direction) when viewed in a direction along the main surface 7s (for example, the Y direction).

In this manner, a space is reduced by disposing the circuit board 7 such that it faces the light source unit 4 and the fixing portion 5 using the support member 8. At this time, since the path reaching the circuit board 7 from the light source unit 4 with the support member 8 therebetween is longer than the direct distance between the light source unit 4 and the circuit board 7, transfer of heat generated in the light sources 40 to the circuit board 7 can be curbed. Accordingly, malfunction due to heat and deterioration in characteristics are curbed.

In addition, the optical head 1 includes the connector 64 provided in the other end portion 62 of the optical fiber 6 and connecting the optical fiber 6 to another optical fiber. For this reason, the optical fiber 6 can be easily connected to another optical fiber using the connector 64.

In addition, the optical head 1 includes the holding member 11 holding the connector 64, and the fixing member 113 for fixing the holding member 11 to the casing 2. The long hole 111h is formed in the holding member 11. The holding member 11 is disposed on the bottom plate 29 of the casing 2 such that the long hole 111h lies along the optical axis direction of the optical fiber 6, and is fixed to the bottom plate 29 by the fixing member 113 inserted through the long hole 111h. For this reason, the positions of the optical fiber 6, the connector 64, and the holding member 11 can be easily adjusted in the extending direction of the long hole 111h (that is, the optical axis direction of the optical fiber 6, the Y direction).

Moreover, the optical head 1 includes the cap 3 holding the window member 31. The cap 3 is disposed on the outward side of the casing 2 and attached to the casing 2. For this reason, the window member 31 can be attached and detached outside the casing 2.

The foregoing embodiment has described an aspect of the present disclosure Therefore, the present disclosure is not limited to the foregoing embodiment and may be arbitrarily modified. Subsequently, modification examples will be described.

First Modification Example

Figure 13:
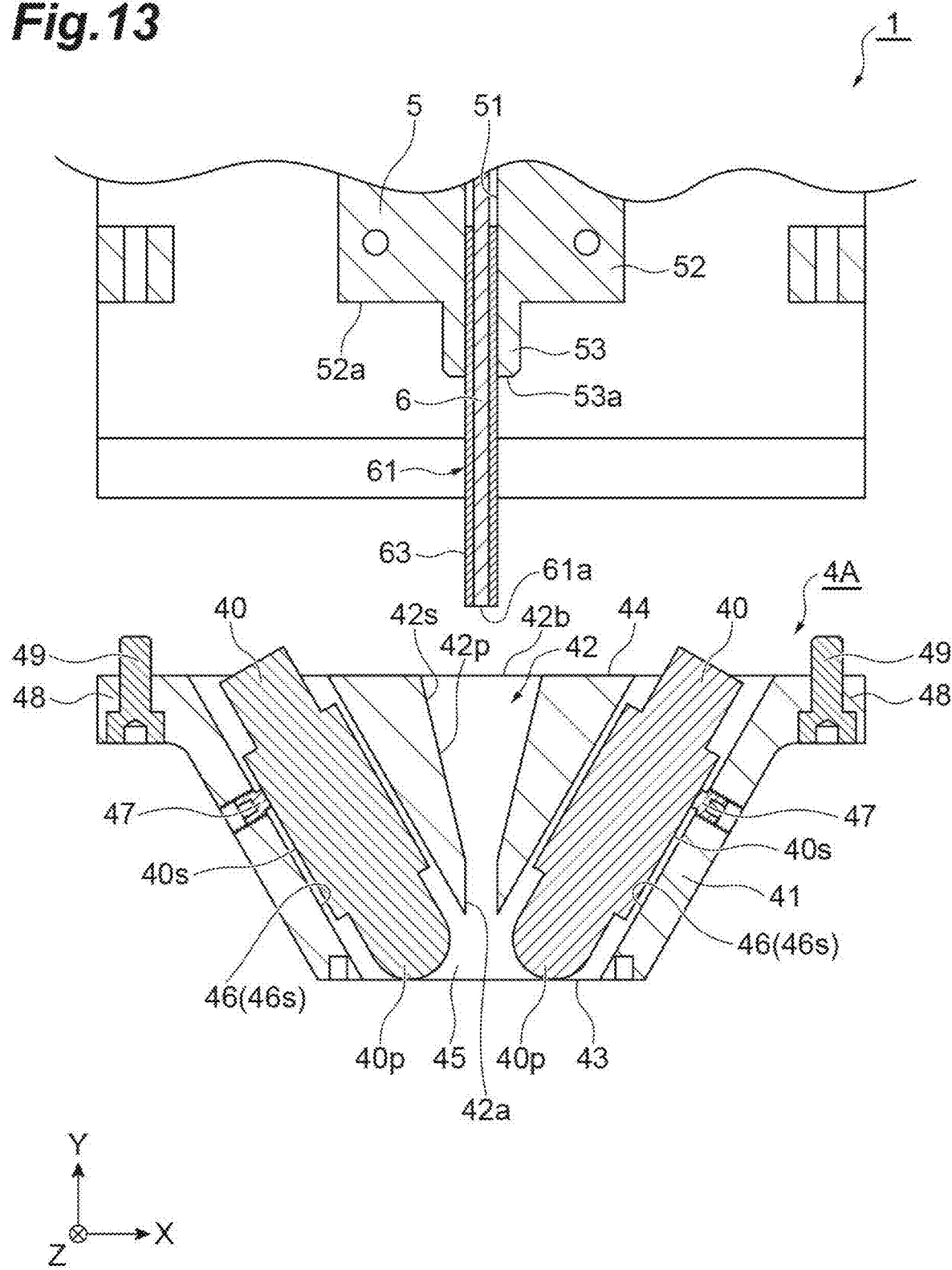
FIG. 13 is an exploded and enlarged cross-sectional view illustrating a part of the optical head according to a first modification example.

FIG. 13 is an exploded and enlarged cross-sectional view illustrating a part of the optical head according to a first modification example. As illustrated in FIG. 13, the optical head 1 according to the first modification example can include a light source unit 4A in place of the light source unit 4. The light source unit 4A differs from the light source unit 4 in that the insertion hole 42 has a different shape compared to the light source unit 4. In the light source unit 4A, the insertion hole 42 includes a tapered portion 42r of which the inner surface 42s is formed into a tapered shape and connected to the opening 42b such that the insertion hole 42 expands from the opening 42a toward the opening 42b.

According to this constitution, when the optical fiber 6 is inserted through the insertion hole 42 from the opening 42b of the insertion hole 42, the one end portion 61 of the optical fiber 6 can be guided toward the opening 42a due to the tapered portion 42r on the inner surface 42s of the insertion hole 42. At this time, if the sleeve 63 is provided in the optical fiber 6, the sleeve 63 slides along the tapered portion 42r so that contact of the one end surface 61a of the optical fiber 6 with the inner surface 42s of the insertion hole 42 is curbed.

Second Modification Example

Figure 14:
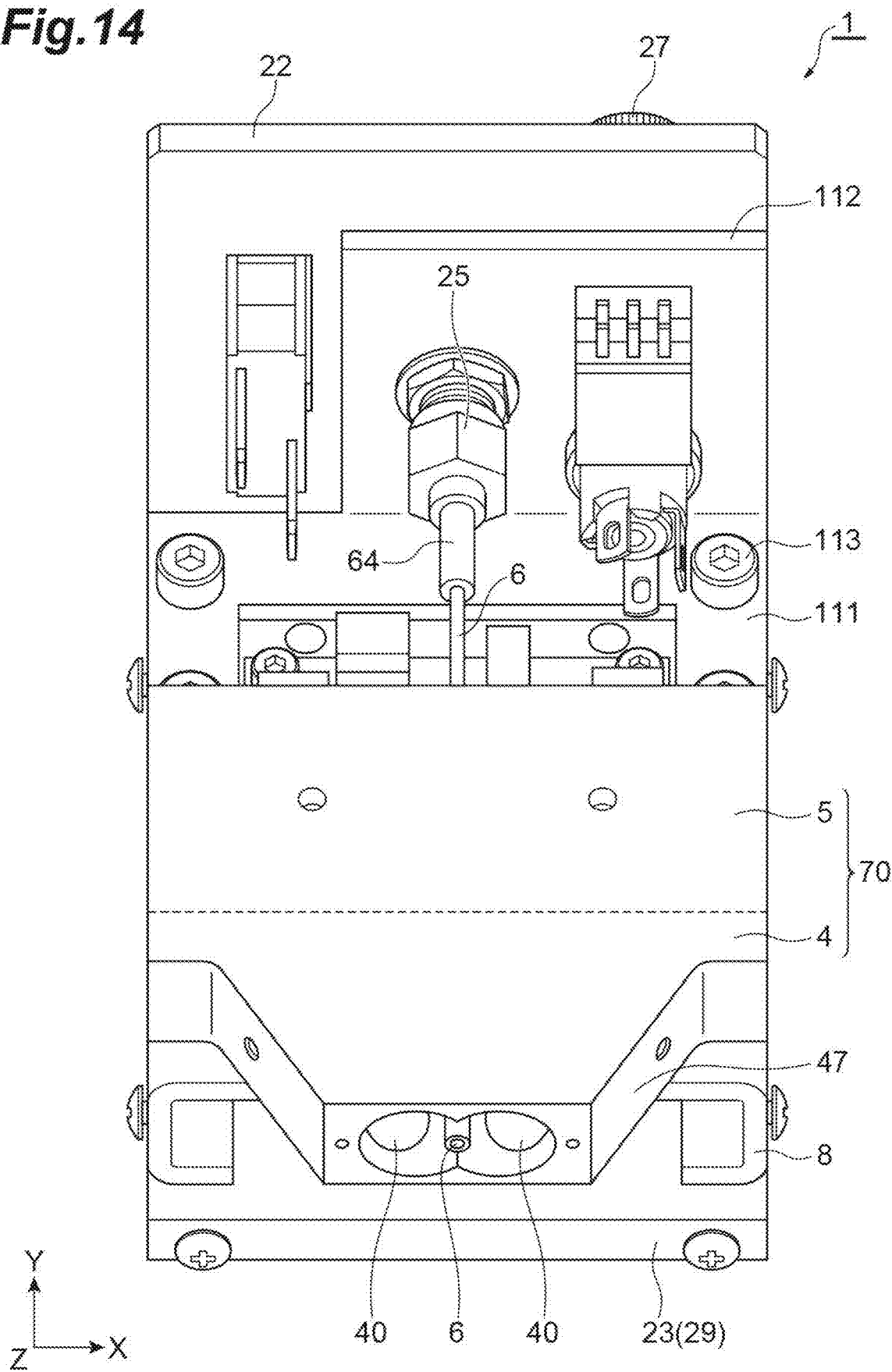
FIG. 14 is a perspective view illustrating a part of the optical head according to a second modification example.
Figure 15:
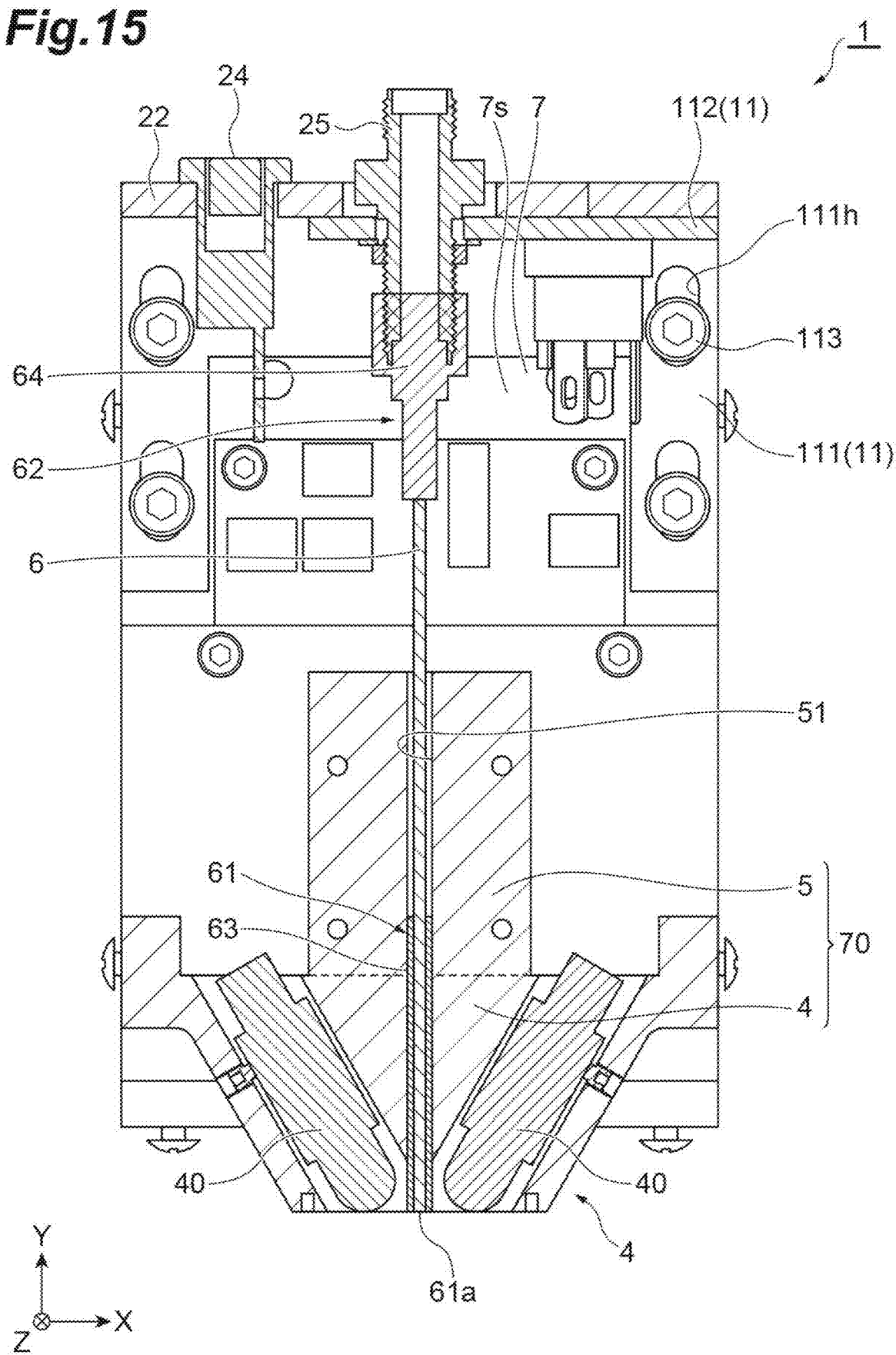
FIG. 15 is a cross-sectional view of the optical head illustrated in FIG. 14.

FIG. 14 is a perspective view illustrating a part of the optical head according to a second modification example. FIG. 15 is a cross-sectional view of the optical head illustrated in FIG. 14. As illustrated in FIGS. 14 and 15, the optical head 1 according to the second modification example includes a light source unit 70 in place of the light source unit 4. The light source unit 70 is constituted of the light source unit 4 and the fixing portion 5 which are integrated. Therefore, in addition to the constitution of the light source unit 4, the light source unit 70 further includes at least the optical fiber 6 and the sleeve 63 serving as the light blocking member. In such a light source unit 70, for example, when the light sources 40 break down, only the light sources 40 can be replaced.

Third Modification Example

Figure 16:
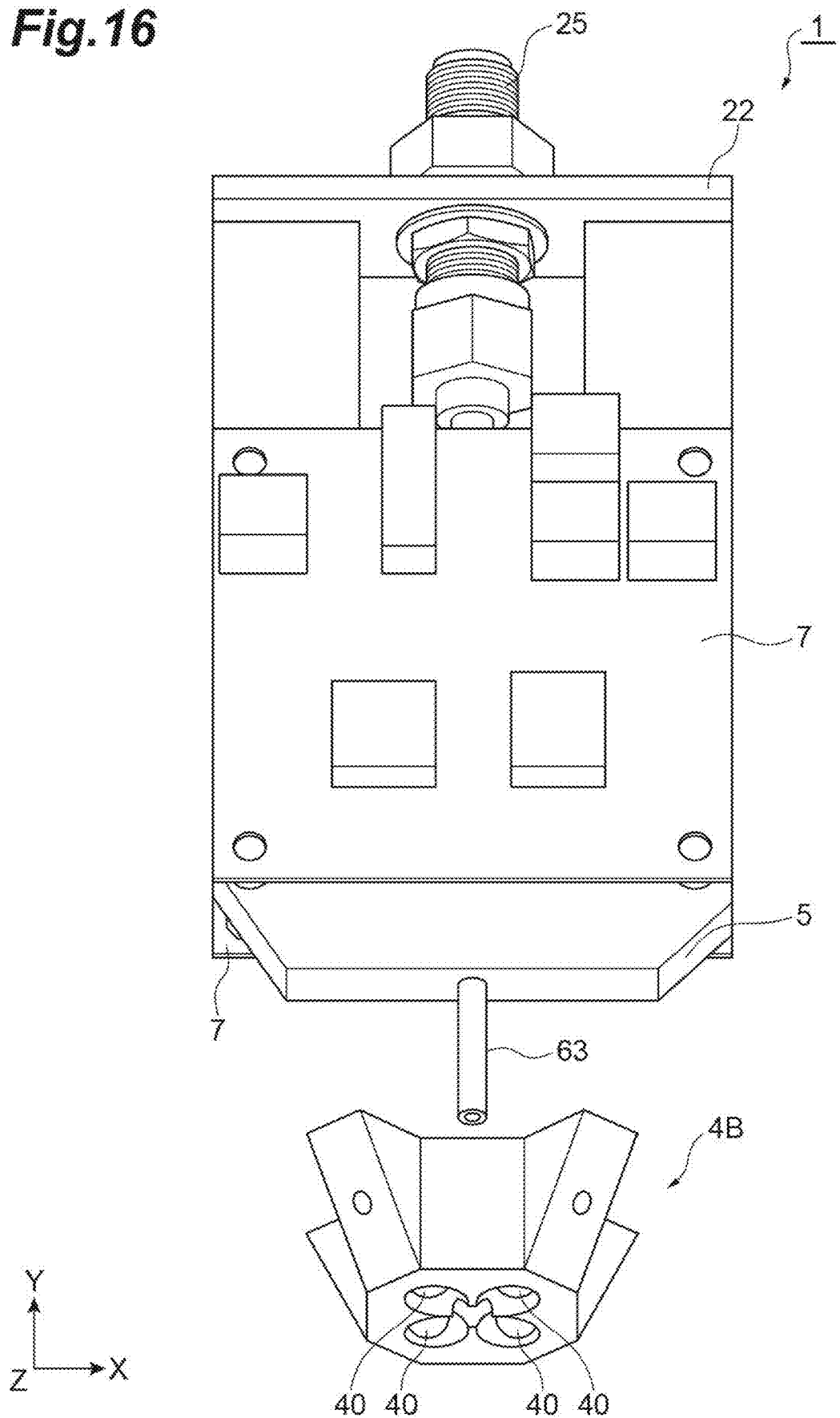
FIG. 16 is a perspective view illustrating a part of the optical head according to a third modification example.
Figure 17:
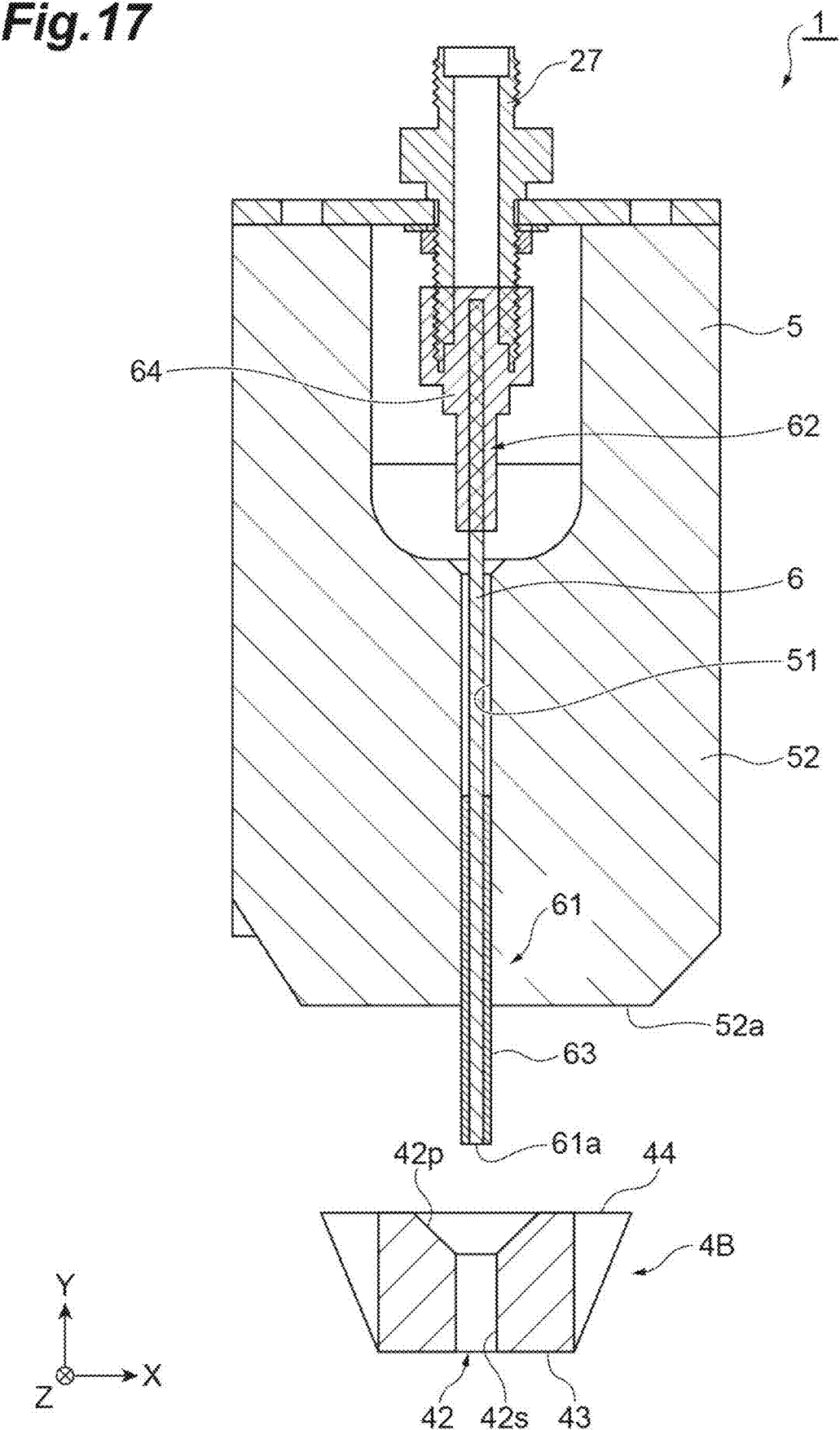
FIG. 17 is an exploded cross-sectional view illustrating the optical head illustrated in FIG. 16.
Figure 18:
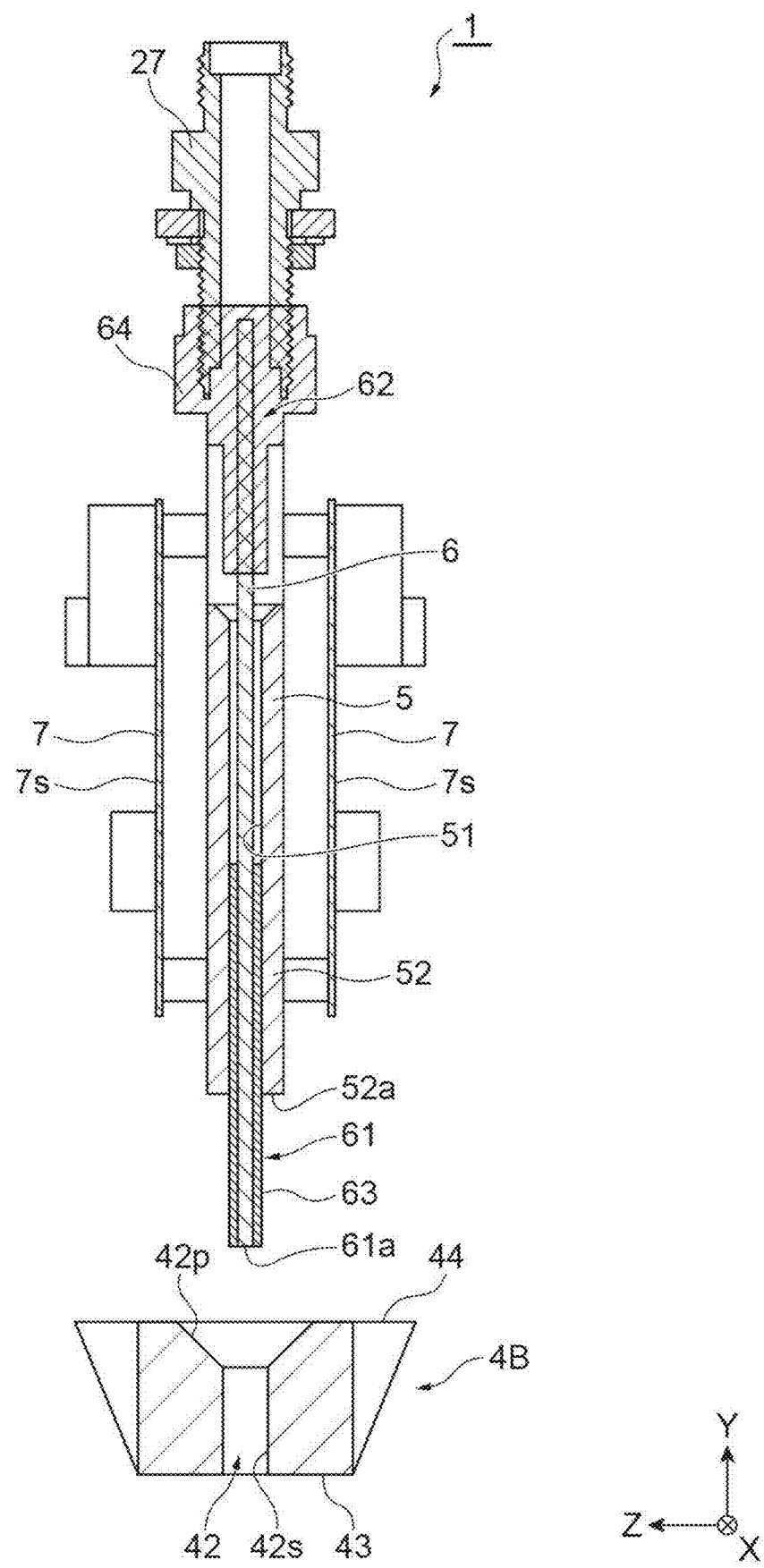
FIG. 18 is another exploded cross-sectional view illustrating the optical head illustrated in FIG. 16.

FIG. 16 is a perspective view illustrating a part of the optical head according to a third modification example. FIGS. 17 and 18 are exploded cross-sectional views illustrating the optical head illustrated in FIG. 16. As illustrated in FIGS. 16 to 18, the optical head 1 according to the third modification example differs from the optical head 1 according to the embodiment in including a light source unit 4B in place of the light source unit 4, in including two circuit boards 7, and in not including the heat sink 9 and the fan 10.

The light source unit 4B differs from the light source unit 4 in having more light sources 40 than those of the light source unit 4.

Here, the light source unit 4B has four light sources 40. The four light sources 40 are disposed at equal intervals (do not have to be disposed at equal intervals) on the circumference about the optical axis 6x of the optical fiber 6. In this manner, in the light source unit 4B, since more light sources 40 are provided, an output of one light source 40 can be restrained. As a result, the amounts of heat generation in the light sources 40 can be restrained. For this reason, in the optical head 1 according to the third modification example, the heat sink 9 and the fan are no longer necessary, and the circuit boards 7 can be disposed on both sides of the fixing portion 5 in the Z direction by utilizing the spaces for the heat sink 9 and the fan 10. In this manner, the light source unit can include any arbitrary number (two or more) of light sources 40.

Fourth Modification Example

Figure 19:
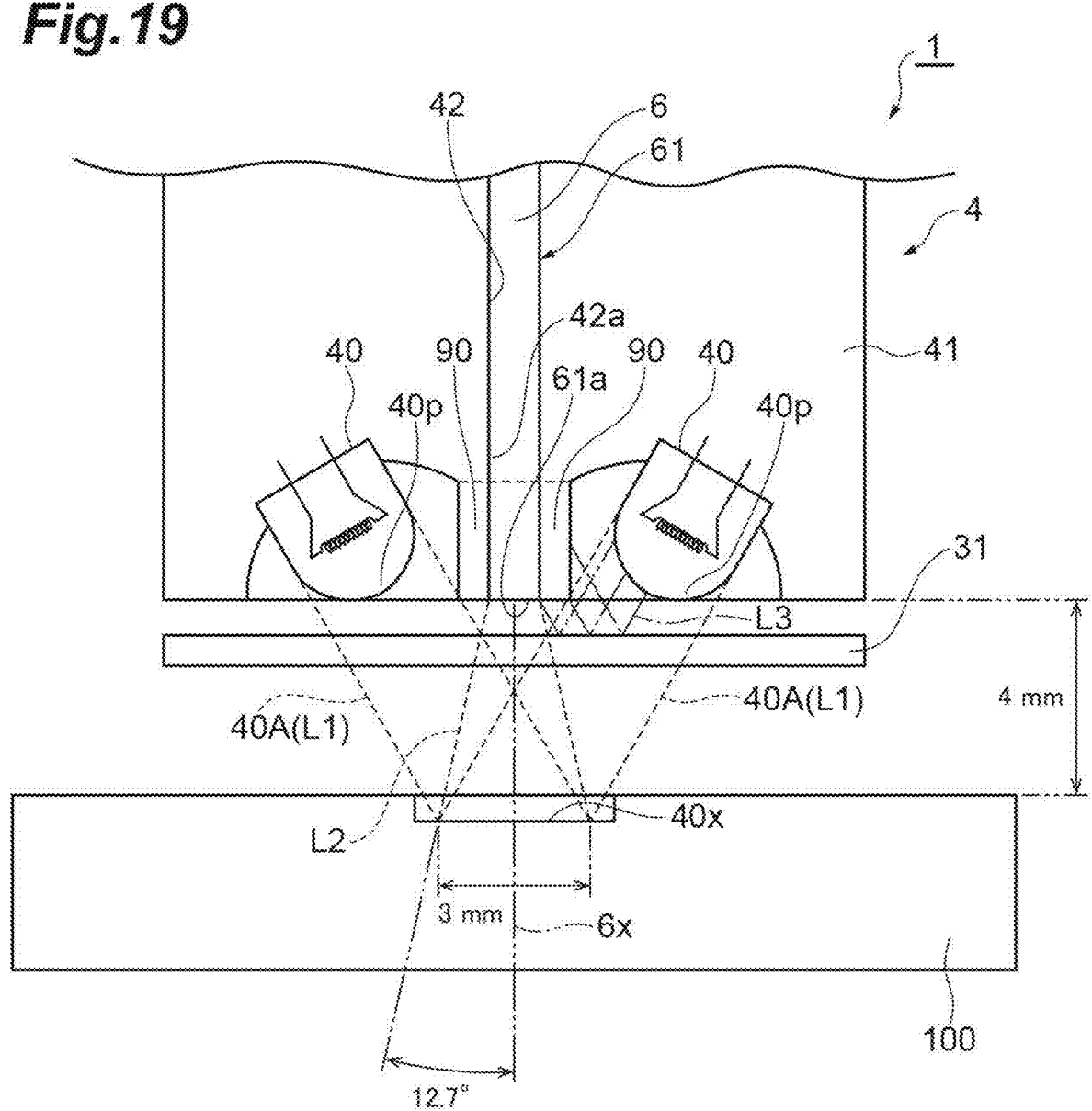
FIG. 19 is a view schematically illustrating a part of the optical head according to a fourth modification example.

FIG. 19 is a view schematically illustrating a part of the optical head according to a fourth modification example. In the foregoing embodiment and other modification examples, a case where the light blocking member for curbing incidence of stray light on the optical fiber 6 is provided as the sleeve 63 in only the optical fiber 6 has been described as an example. However, as illustrated in FIG. 19, the light blocking member for curbing incidence of stray light on the optical fiber 6 may be provided in the holding portion 41. That is, here, the holding portion 41 includes a light blocking portion (light blocking member) 90 provided in a manner of protruding along an edge portion of the opening 42a such that the one end portion 61 of the optical fiber 6 is covered when the optical fiber 6 is inserted through the insertion hole 42 and protrudes from the opening 42a. According to this constitution, when incidence of stray light on the optical fiber 6 is curbed, work of coating the one end portion 61 of the optical fiber 6 with the sleeve 63 or the like is no longer essential. However, the optical fiber 6 may be coated with the sleeve 63.

Fifth Modification Example

Figure 20:
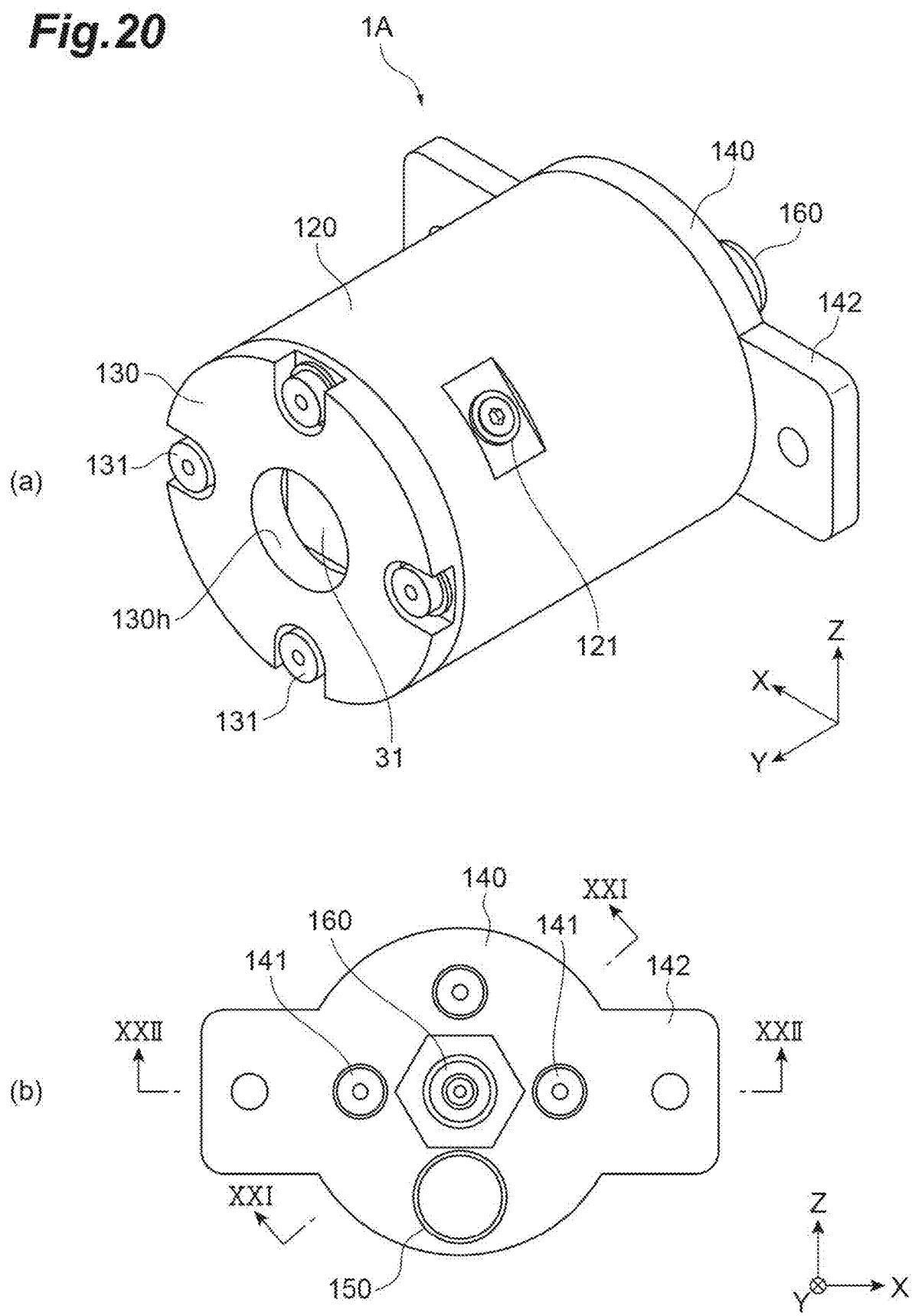
FIG. 20 is a view illustrating the optical head according to a fifth modification example.
Figure 21:
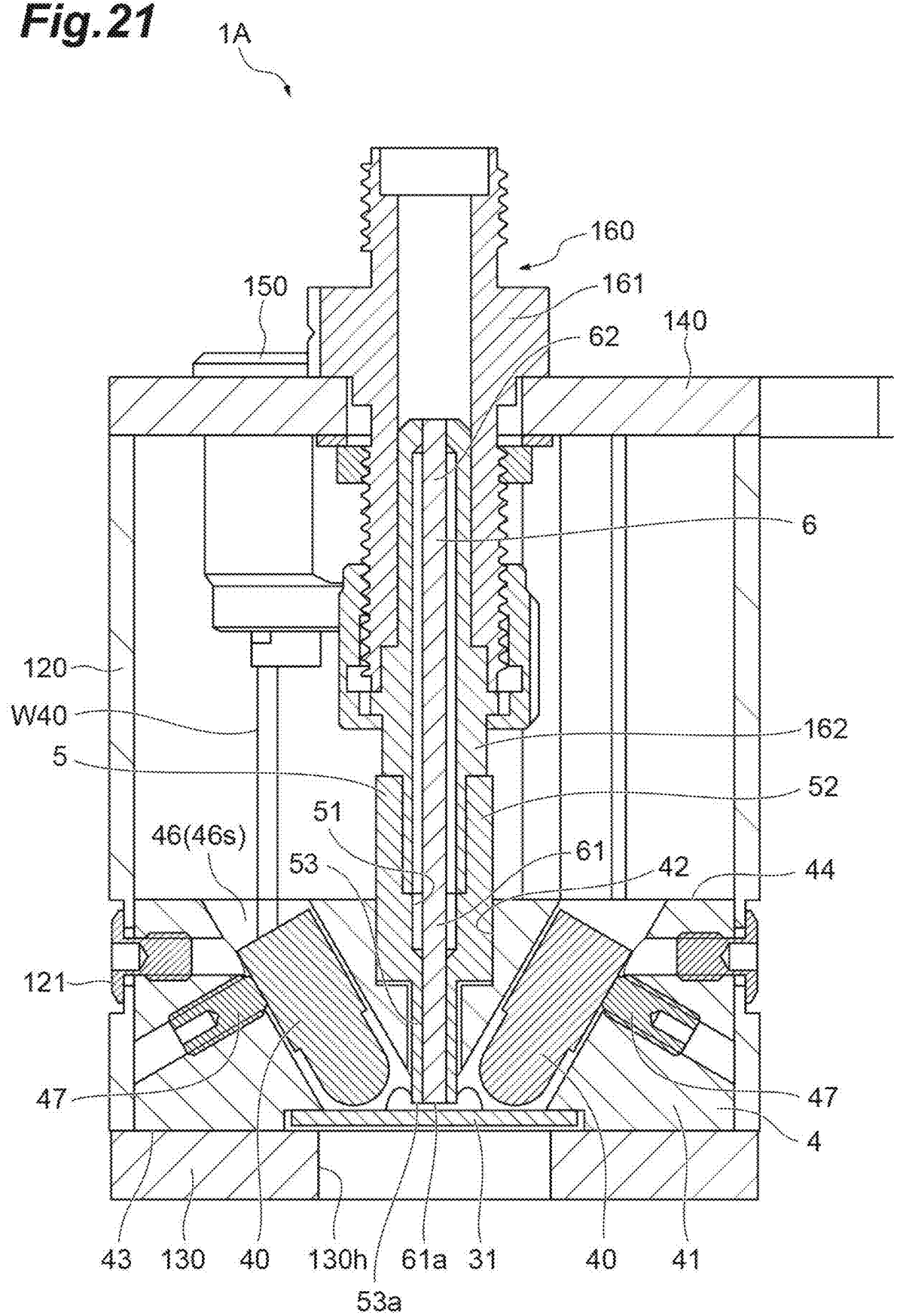
FIG. 21 is a cross-sectional view along line XXI-XXI in FIG.

FIG. 20 is a view illustrating the optical head according to a fifth modification example. FIG. 20(a) is a perspective view, and FIG. 20(b) is a top view. FIG. 21 is a cross-sectional view along line XXI-XXI in FIG. 20(b), and FIG. 22 is a cross-sectional view along line XXII-XXII in FIG. 20(b).

Figure 22:
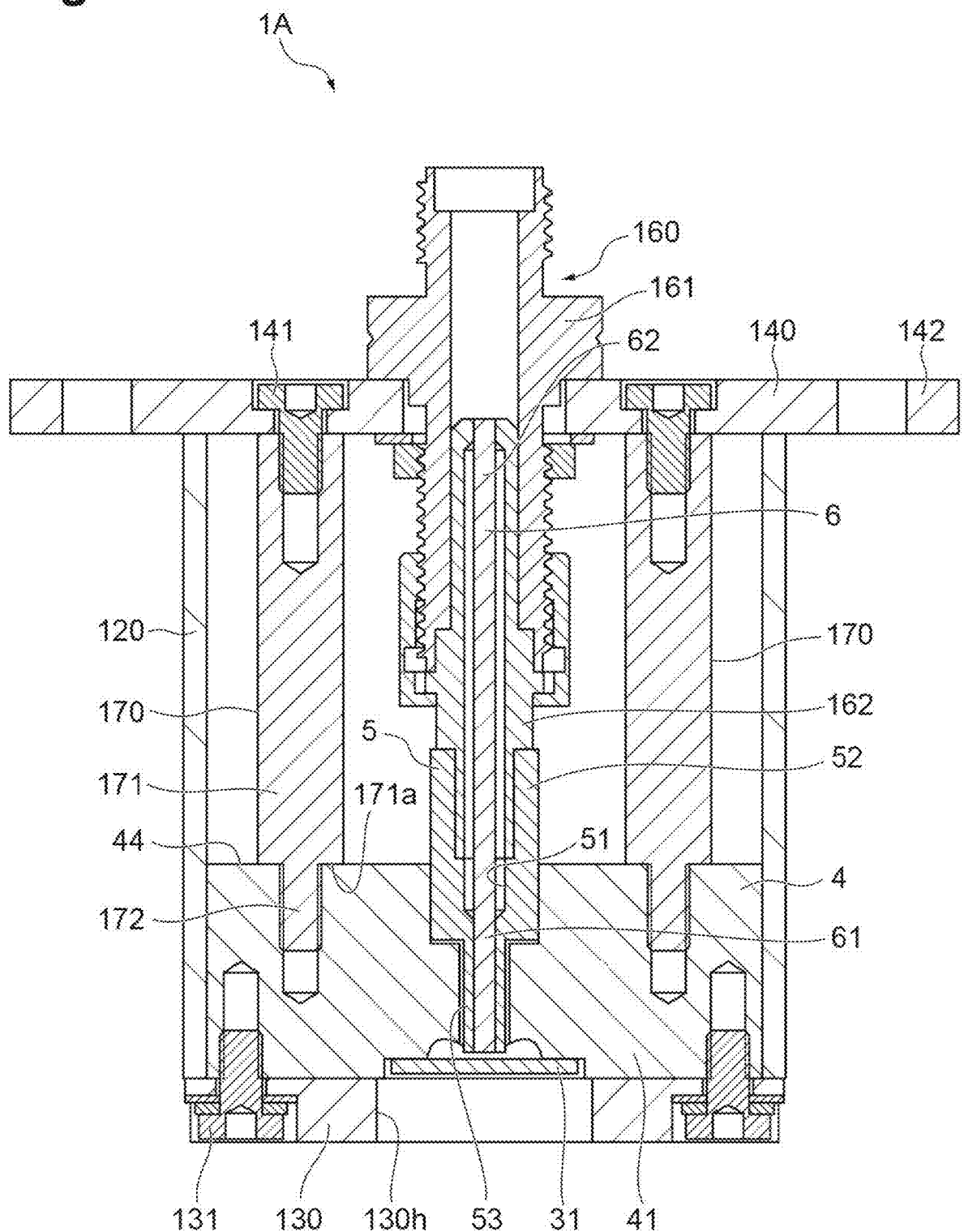
FIG. 22 is a cross-sectional view along line XXII-XXII in FIG.

As illustrated in FIGS. 20 to 22, an optical head 1A includes the light source unit 4, the fixing portion 5, and the optical fiber 6. The light source unit 4 has a plurality of (here, four) light sources 40 and the holding portion 41 holding the light sources 40. Compared to the optical head 1, the optical head 1A does not include the circuit board 7, the support member 8, the heat sink 9, the fan 10, and the holding member 11. The optical head 1A includes a casing 120, a spacer 130, and a lid member 140. The casing 120 is formed into a tubular shape (here, a cylindrical shape) of which both ends open. The spacer 130 is provided at one end of the casing 120, and the lid member 140 is provided at the other end of the casing 120.

The holding portion 41 is inserted into the one end of the casing 120 and disposed inside the casing 120. The holding portion 41 has an external shape along the inner surface of the casing 120. That is, the holding portion 41 exhibits a pillar shape (here, a columnar shape). The holding portion 41 is fixed to the casing 120 in a state of being inserted into the one end of the casing 120, for example, using a fixing member 121 such as a screw.

In the lid member 140, a power source connector 150 is provided in a penetrating manner. Namely, the power source connector 150 is provided in a manner of reaching the inside of the casing 120 from the outside and attached to the casing 120 with the lid member 140 therebetween. For example, the power source cable A4 is connected to the power source connector 150 on the outer side of the casing 120. Meanwhile, the light sources 40 are connected to the power source connector 150 on the inner side of the casing 120. The light sources 40 and the power source connector 150 are directly connected to each other (without going through a circuit board or the like) through wirings W40. Here, in each of the wirings W40, one end is connected to the power source connector 150 and the other end is connected to a lead pin (lead wire) of each of the light sources 40. That is, the optical head 1A includes the wirings W40 connecting the power source connector 150 to the respective lead wires of the light sources 40.

In addition, a head portion of a fixing member 141 such as a screw is exposed in the lid member 140. A plurality of struts 170 are provided between the lid member 140 and the holding portion 41. The struts 170 each include a shaft portion 171, and a protruding portion 172 protruding from one end surface 171a of the shaft portion 171. The struts 170 are fixed to the holding portion 41 when the one end surface 171a of the shaft portion 171 abuts the end surface 44 of the holding portion 41 and the protruding portion 172 is coupled (for example, screwed) to the holding portion 41. Meanwhile, the struts 170, in which the other end surface of the shaft portion 171 abuts the lid member 140, are fixed to the lid member 140 by the fixing member 141. Accordingly, the struts 170 support the lid member 140 while generating spaces according to the length of the shaft portion 171 on the holding portion 41.

Moreover, an optical fiber connector 160 is provided in a penetrating manner in the lid member 140. Namely, the optical fiber connector 160 is attached to the casing 120 with the lid member 140 therebetween in a manner of reaching the inside of the casing 120 from the outside. The optical fiber connector 160 includes a connection portion 161 protruding to the outside of the casing 120, fixed to the lid member 140, and receives connection of another optical fiber such as the optical fiber A3, for example. In addition, the optical fiber connector 160 includes a holding portion 162 held by the connection portion 161 inside the casing 120 and internally holding the optical fiber 6.

The fixing portion 5 is provided at an end portion of the holding portion 162 on a side opposite to the connection portion 161 and holds the optical fiber 6 protruding from the holding portion 162. The penetration hole 51 extending in one direction (here, the Y direction) is formed in the fixing portion 5. The fixing portion 5 includes the tubular base portion 52 having the extending direction of the penetration hole 51 as the longitudinal direction, and the protruding portion 53 provided in a manner of protruding from the base portion 52 in the extending direction. The optical fiber 6 is inserted through the penetration hole 51 and reaches the distal end of the protruding portion 53. Here, the end surface 53a of the protruding portion 53 and the one end surface 61a of the one end portion 61 of the optical fiber are substantially flush with each other. Accordingly, the one end portion 61 of the optical fiber 6 is covered by the protruding portion 53 except for the one end surface 61a.

Figure 23:
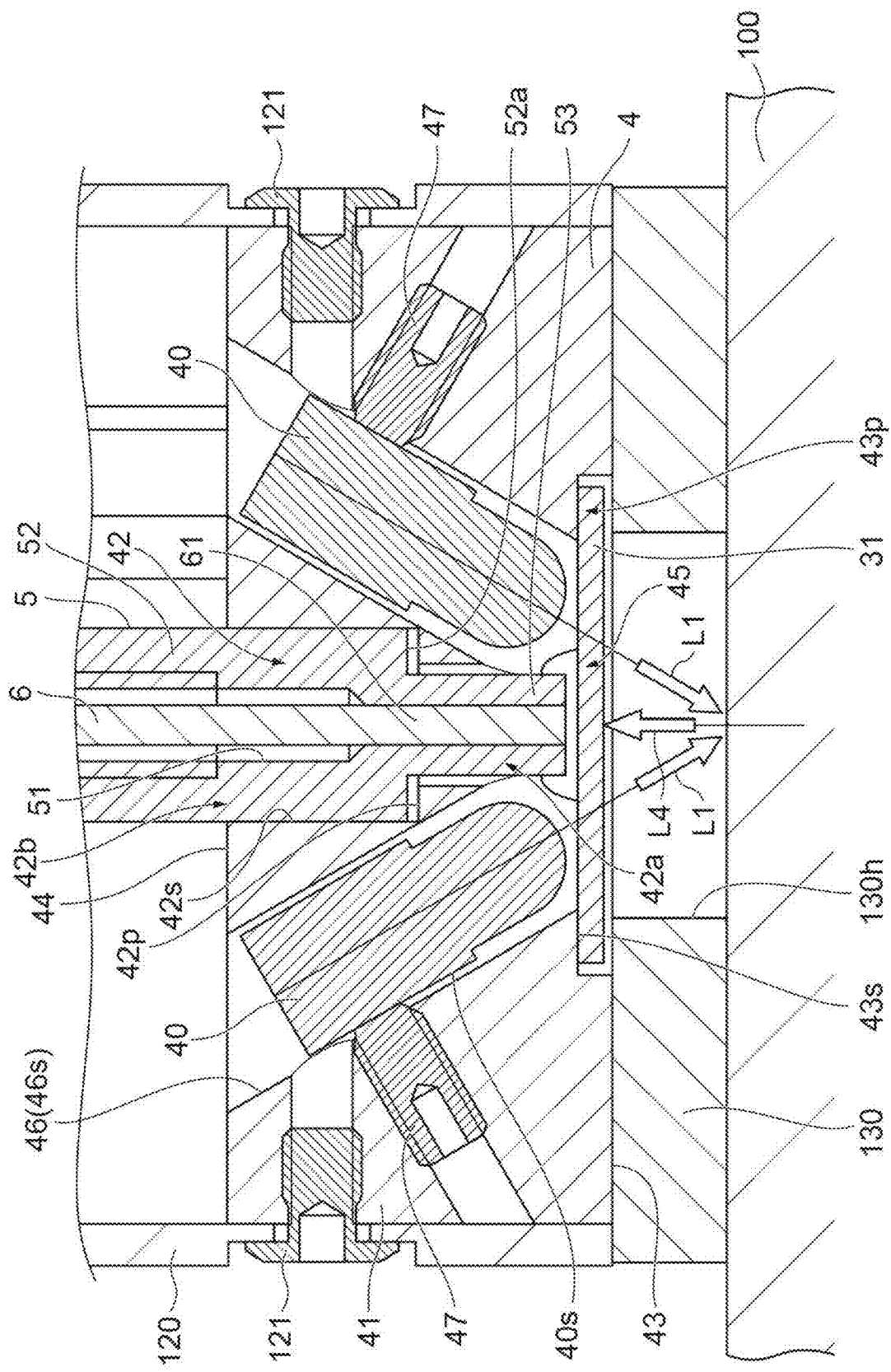
FIG. 23 is an enlarged view of a part in FIGS. 21 and 22.

FIG. 23 is an enlarged view of a part in FIGS. 21 and 22. As illustrated in FIG. 23, a part of the base portion 52 of the fixing portion 5 and the protruding portion 53 are inserted through the insertion hole 42 of the holding portion 41 in a state of holding the optical fiber 6. Further, a part of the protruding portion 53 and a part of the one end portion 61 of the optical fiber 6 protrude inside the recessed portion 45. Accordingly, the optical fiber 6 is set such that the one end portion 61 including the one end surface 61a thereof is positioned between the plurality of light sources 40 with the protruding portion 53 therebetween. Therefore, here, the protruding portion 53 of the fixing portion 5 functions as the light blocking member for curbing incidence of stray light on the optical fiber 6. In other words, here, the fixing portion 5 includes the light blocking member (the protruding portion 53) covering the one end portion 61 of the optical fiber 6, inserted through the insertion hole 42 together with the optical fiber 6, and protruding from the opening 42a. Here, four hole portions 46 are formed in the holding portion 41, and the light sources 40 are disposed in the respective hole portions 46. Therefore, here, the one end portion 61 of the optical fiber 6 is disposed in a manner of being surrounded by the four light sources 40 with the protruding portion 53 therebetween. The end surface 52a of the base portion 52 of the fixing portion 5 and the flat surface portion 42p provided on the inner surface 42s of the insertion hole 42 of the holding portion 41 may come into contact with each other, but in the illustrated example, they are separated from each other with a gap formed therebetween. In this example, the fixing portion 5 holding the optical fiber 6 is attached to the optical fiber connector 160 that is attached to the lid member 140, and the lid member 140 and the holding portion 41 are fixed to each other by the struts 170. Accordingly, the position of the optical fiber 6 held by the fixing portion 5 may be fixed. In other words, in this case, the fixing portion 5 fixes the position of the optical fiber 6 with another member therebetween. Alternatively, the position of the optical fiber 6 may be fixed without depending on another member by fitting the fixing portion 5 into the insertion hole 42 of the holding portion 41. That is, even when the end surface 52a of the fixing portion 5 and the flat surface portion 42p of the holding portion 41 facing the end surface 52a are separated, the fixing portion 5 may be regarded as a member for fixing the position of the optical fiber 6. In addition, even when the end surface 52a of the fixing portion 5 and the flat surface portion 42p of the holding portion 41 facing the end surface 52a, and the outer surface (side surface) of the base portion 52 and the inner surface 42s of the insertion hole 42 are not in contact with each other and a clearance is provided therebetween, the fixing portion 5 may be regarded as a member for fixing the position of the optical fiber 6 in cooperation with the holding portion 41.

The spacer 130 is attached to the holding portion 41 in a state of being in contact with the end surface 43 of the holding portion 41. A recessed portion 43p leading to the recessed portion 45 is formed on the end surface 43. The recessed portion 43p includes a bottom surface 43s facing the spacer 130 side. The bottom surface 43s is formed into an annular shape in a manner of surrounding an opening portion of the recessed portion 45 when viewed in a direction intersecting the end surface 43. The window member 31 is disposed inside the recessed portion 43p and attached to the bottom surface 43s. In this manner, the window member 31 is attached to the holding portion 41 (the bottom surface 43s) in a manner of being interposed between the light sources 40 and the spacer 130.

An opening (third opening) 130h is formed in the spacer 130 such that the opening 42a of the insertion hole 42 is exposed when viewed in a direction intersecting the end surface 43 and the light L1 from each of the plurality of light sources 40 and light L4 toward an end surface 61s of the optical fiber 6 pass therethrough. Therefore, in a state where the spacer 130 is attached to the holding portion 41, the object 100 can be irradiated with the light L1, and the light L4 from the object 100 can be detected. On the other hand, in a state where the window member 31 is attached to the holding portion 41, the spacer 130 can be attached and detached with respect to the holding portion 41. Therefore, even in a state where the spacer 130 is detached, the object 100 can be irradiated with the light L1 and the light L4 from the object 100 can be detected with the window member 31 therebetween.

As described above, the optical head 1A according to the present modification example exhibits effects similar to those of the foregoing optical head 1. Moreover, in the optical head 1A, the fixing portion 5 includes the light blocking member (the protruding portion 53) covering the one end portion 61 of the optical fiber 6, inserted through the insertion hole 42 together with the optical fiber 6, and protruding from the opening 42a. In this manner, by providing the light blocking member in the fixing portion 5, when incidence of stray light on the optical fiber 6 is curbed, for example, work of coating the one end portion 61 of the optical fiber 6 with the light blocking member or providing the light blocking member in the holding portion 41 is no longer essential. However, the optical fiber 6 may be coated with the light blocking member, and the light blocking member may further be provided in the holding portion 41.

In addition, the optical head 1A includes the spacer 130 detachably attached to the holding portion 41 using a fixing member 131 such as a screw, and the opening 130h is formed in the spacer 130 such that the opening 42a is exposed and the light L1 of each of the plurality of light sources 40 passes therethrough. Further, the window member 31 is attached to the holding portion 41 in a manner of being interposed between the light sources 40 and the spacer 130. For this reason, while the one end surface 61a of the optical fiber is kept clean by the window member 31, it can be used in both the state where the spacer 130 is attached and the state where the spacer 130 is detached. As an example, in the state where the spacer 130 is attached, the distances between the light sources 40 and a sample (the object 100) can be simply determined through measurement in which the spacer 130 is brought into contact with the sample. Meanwhile, in the state where the spacer is detached, measurement can be performed by providing a space with respect to a fluidal sample such as a fluid, for example, while the distances between the light sources 40 and the sample are maintained.

Moreover, the optical head 1A includes the power source connector 150 attached to the casing 120 in a manner of reaching the inside of the casing 120 from the outside and supplying power to the light sources 40, and the wirings W40 connecting the power source connector 150 to the respective lead wires of the light sources 40. For this reason, miniaturization can be achieved compared to when the power source connector 150 and the light sources 40 are connected via the circuit board or the like. Heat generation in the light sources 40 can be restrained by increasing the number of light sources 40 to four or more, for example, and using each of the light sources 40 with low power. In this case, further miniaturization can be achieved without providing a heat sink, a cooling fan, or the like inside the casing 120. In addition, in this case, the life of the light sources 40 can also be extended.

In the optical head 1A, a heat sink can be provided on the outward side of the miniaturized casing 120. In this case, as an example, a heat sink may be formed into a tubular shape having an internal shape similar to the external shape of the casing 120, and the casing 120 may be inserted into the heat sink such that the inner surface of the heat sink and the outer circumferential surface of the casing 120 come into contact with each other. At this time, a flange portion 142 of the lid member 140 can be utilized for fixing the heat sink. A plurality of fins arrayed radially when viewed in the axial direction of the heat sink can be formed on the outer circumferential surface of the heat sink. In this case, each of the fins may be constituted in a manner of extending in the axial direction substantially throughout the entire heat sink.

Other Modification Examples

In the foregoing embodiment, a case where the holding portion 41 holds two light sources 40 such that the two light sources 40 are disposed on a straight line orthogonal to the optical axis 6x of the optical fiber 6 has been described as an example. However, the plurality of light sources 40 need only be disposed separately from each other by at least the diameter of the optical fiber 6 or longer (when the sleeve 63 is provided, the outer diameter of the sleeve 63), and they may be arbitrarily disposed. As an example, the holding portion 41 can also hold the plurality of light sources 40 such that the angle of the corner connecting two light sources 40 and the optical axis 6x of the optical fiber 6 becomes or larger when viewed in the optical axis direction of the optical fiber 6 (Y direction).

In addition, in the foregoing embodiment, an example in which the light source unit 4 and the optical head 1 or 1A are utilized together with the spectrometer A2 has been described, but it is not limited to this. The light source unit 4 and the optical head 1 or 1A may be utilized for an arbitrary device for irradiating an object with light and providing light from the object to the photodetector. Moreover, even when the light source unit 4 and the optical head 1 or 1A are utilized together with the spectrometer A2, they may be constituted such that visible light of approximately 400 nm to 800 nm is provided to the photodetector of the spectrometer A2.

Furthermore, a constitution in which at least a part of the foregoing embodiment and the foregoing first to fifth modification examples is arbitrarily replaced may be employed. For example, the light source unit 4B according to the third modification example may be constituted integrally with the fixing portion 5 as in the light source unit according to the second modification example. In addition, the light blocking portion 90 according to the fourth modification example may be provided in the holding portion 41 according to other modification examples.

INDUSTRIAL APPLICABILITY

It is possible to provide a light source unit capable of curbing incidence of stray light on an optical fiber while effectively propagating light from an object through the optical fiber, and an optical head.

REFERENCE SIGNS LIST 1, 1A Optical head
2 Casing

3 Cap
4, 4A, 4B Light source unit
5 Fixing portion
6 Optical fiber
6x Optical axis
7 Circuit board
7s Main surface
8 Support member
11 Holding member (connector holding member)
31 Window member
40 Light sources
41 Holding portion
42 Insertion hole
42a Opening (first opening)
42b Opening (second opening)
42s Inner surface
42p Flat surface portion
42r Tapered portion
43, 44 End surface
46 Hole portion
46s Inner surface
61 One end portion
61a One end surface
62 The other end portion
63 Sleeve (light blocking member)
64 Connector
90 Light blocking portion (light blocking member)
120 Casing
130 Spacer
130h Opening (third opening)
150 Power source connector
W40 Wiring

The invention claimed is:

1. A light source unit comprising:
a plurality of light sources configured to emit light for irradiating an object; and
a holding portion configured to hold the plurality of light sources and formed with an insertion hole configured to be inserted an optical fiber for propagating the light from the object,
wherein the holding portion holds each of the plurality of light sources such that an irradiation region of the light of each of the plurality of light sources is formed on one side of the holding portion,
wherein the insertion hole includes a first opening that is an opening facing the irradiation region and a second opening that is an opening different from the first opening, and is formed in the holding portion such that one end surface of the optical fiber is exposed from the first opening and faces the irradiation region when the optical fiber is inserted therethrough, and
wherein one end portion of the optical fiber including the one end surface is positioned between the plurality of light sources with a light blocking member therebetween when the optical fiber is inserted through the insertion hole.

2. The light source unit according to claim 1,
wherein the insertion hole is formed in the holding portion such that one end surface of the optical fiber protrudes from the first opening when the optical fiber is inserted therethrough.

3. The light source unit according to claim 1,
wherein the holding portion includes a flat surface portion intersecting a direction toward the second opening from the first opening, and
wherein the flat surface portion is formed on at least one of an end surface of the holding portion having the second opening formed therein and an inner surface of the insertion hole.

4. The light source unit according to claim 1,
wherein the holding portion includes the light blocking member provided in a manner of protruding along an edge portion of the first opening such that the one end portion of the optical fiber is covered when the optical fiber is inserted through the insertion hole and protrudes from the first opening.

5. The light source unit according to claim 1,
wherein an inner surface of the insertion hole includes a tapered portion formed into a tapered shape such that the insertion hole expands from the first opening toward the second opening, and connected to the second opening.

6. The light source unit according to claim 1,
wherein the holding portion holds the plurality of light sources such that the irradiation regions of the plurality of respective light sources overlap each other, and
wherein the insertion hole is formed such that an optical axis of the optical fiber passes through an overlapping region where the irradiation regions of the plurality of light sources overlap each other when the optical fiber is inserted therethrough.

7. The light source unit according to claim 1,
wherein hole portions configured to dispose the plurality of light sources are formed in the holding portion,
wherein the holding portion holds the plurality of light sources in a state where outer surfaces of the plurality of light sources are in contact with inner surfaces of the hole portions, and
wherein at least parts on the inner surfaces of the hole portions coming into contact with the outer surfaces of the plurality of light sources are formed into shapes along shapes of the outer surfaces of the light sources.

8. The light source unit according to claim 7,
wherein the holding portion includes resin portions filling spaces between the inner surfaces of the hole portions and the outer surfaces of the light sources.

9. An optical head configured to irradiate an object with light and to provide light from the object to a photodetector, the optical head comprising:
the light source unit according to claim 1;
a fixing portion holding the optical fiber and fixing a position of the optical fiber;
the optical fiber inserted through the insertion hole while being fixed to the fixing portion;
a casing accommodating at least a part of the light source unit, the fixing portion, and the optical fiber; and
a light transmissive window member disposed so as to face the one end surface of the optical fiber.

10. The optical head according to claim 9,
wherein the light source unit and the fixing portion are formed separately from each other,
wherein the fixing portion holds the optical fiber in a state where the one end portion of the optical fiber protrudes from the fixing portion, and
wherein the light source unit is detachably attached to the fixing portion in a state where the one end portion of the optical fiber protruding from the fixing portion is inserted through the insertion hole.

11. The optical head according to claim 9 further comprising:

the light blocking member provided in the optical fiber such that at least the one end portion of the optical fiber is coated therewith while the one end surface is exposed.

12. The optical head according to claim 9,
wherein the window member faces the plurality of light sources such that the light emitted from the plurality of light sources passes therethrough, and is provided at a position where the light emitted from the plurality of light sources and reflected by the window member is not incident on the optical fiber in an optical axis direction of the optical fiber.

13. The optical head according to claim 9,
wherein the window member is provided so as to face the plurality of light sources such that light emitted from the plurality of light sources passes therethrough,
wherein a wavelength region of the light emitted from the plurality of light sources includes a first wavelength region included in a sensitivity region of the photodetector, and a second wavelength region different from the sensitivity region of the photodetector, and
wherein the window member reduces a reflectance of the first wavelength region and reduces a transmittance of the second wavelength region.

14. The optical head according to claim 9 further comprising:
a circuit board having a main surface and electrically connected to the light sources; and
a support member configured to support the light source unit and the fixing portion,
wherein the light source unit and the fixing portion are arrayed in a direction toward the second opening from the first opening,
wherein the circuit board is disposed so as to face the light source unit and the fixing portion when viewed in a direction along the main surface, and
wherein the support member is formed such that a path from the light source unit toward the circuit board with the support member therebetween is longer than a distance between the circuit board and the light source unit in a direction intersecting the main surface when viewed in a direction along the main surface.

15. The optical head according to claim 9 further comprising:
a connector provided in the other end portion of the optical fiber and configured to connect the optical fiber to another optical fiber.

16. The optical head according to claim 15 further comprising:
a connector holding member configured to hold the connector; and
a fixing member configured to fix the connector holding member to the casing,
wherein a long hole is formed in the connector holding member, and
wherein the connector holding member is disposed on a wall portion of the casing such that the long hole lies along an optical axis direction of the optical fiber, and is fixed to the wall portion by the fixing member inserted through the long hole.

17. The optical head according to claim 9 further comprising:
a cap configured to hold the window member,
wherein the cap is disposed on an outward side of the casing and attached to the casing.

18. The optical head according to claim 9,
wherein the fixing portion includes the light blocking member configured to cover the one end portion of the optical fiber, inserted through the insertion hole together with the optical fiber, and protruding from the first opening.

19. The optical head according to claim 9 further comprising:
a spacer detachably attached to the holding portion,
wherein a third opening is formed in the spacer such that the first opening is exposed and the light of each of the plurality of light sources passes therethrough, and
wherein the window member is attached to the holding portion in a manner of being interposed between the light sources and the spacer.

20. The optical head according to claim 9 further comprising:
a power source connector provided so as to reach the inside of the casing from the outside and configured to supply power to the light sources; and
wirings configured to connect the power source connector and lead wires of the respective light sources.

* * * * *